United States Patent
Liu et al.

(10) Patent No.: US 11,922,303 B2
(45) Date of Patent: Mar. 5, 2024

(54) SYSTEMS AND METHODS FOR DISTILLED BERT-BASED TRAINING MODEL FOR TEXT CLASSIFICATION

(71) Applicant: Salesforce.com, Inc., San Francisco, CA (US)

(72) Inventors: Wenhao Liu, Redwood City, CA (US); Ka Chun Au, Milbrae, CA (US); Shashank Harinath, San Francisco, CA (US); Bryan McCann, Menlo Park, CA (US); Govardana Sachithanandam Ramachandran, Palo Alto, CA (US); Alexis Roos, Los Angeles, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 552 days.

(21) Appl. No.: 16/877,339

(22) Filed: May 18, 2020

(65) Prior Publication Data
US 2021/0150340 A1    May 20, 2021

Related U.S. Application Data

(60) Provisional application No. 62/968,973, filed on Jan. 31, 2020, provisional application No. 62/937,085, filed on Nov. 18, 2019.

(51) Int. Cl.
*G06N 3/00* (2023.01)
*G06F 40/40* (2020.01)
(Continued)

(52) U.S. Cl.
CPC .............. *G06N 3/08* (2013.01); *G06F 40/40* (2020.01); *G06N 3/045* (2023.01)

(58) Field of Classification Search
CPC ...... G06N 3/08; G06N 3/0454; G06N 3/0481; G06N 3/084; G06F 40/40; G10L 15/146; G10L 15/063
See application file for complete search history.

(56) References Cited

U.S. PATENT DOCUMENTS 10,282,663 B2   5/2019  Socher et al.
10,346,721 B2   7/2019  Albright et al.
(Continued)

OTHER PUBLICATIONS

Sun S, Cheng Y, Gan Z, Liu J. Patient knowledge distillation for bert model compression. arXiv preprint arXiv:1908.09355. Aug. 25, 2019. (Year: 2019).*

(Continued)

*Primary Examiner* — Douglas Godbold
*Assistant Examiner* — Parker Mayfield
(74) *Attorney, Agent, or Firm* — Haynes and Boone LLP

(57) ABSTRACT

Embodiments described herein provides a training mechanism that transfers the knowledge from a trained BERT model into a much smaller model to approximate the behavior of BERT. Specifically, the BERT model may be treated as a teacher model, and a much smaller student model may be trained using the same inputs to the teacher model and the output from the teacher model. In this way, the student model can be trained within a much shorter time than the BERT teacher model, but with comparable performance with BERT.

20 Claims, 16 Drawing Sheets

(51) Int. Cl.
*G06N 3/045* (2023.01)
*G06N 3/08* (2023.01)

(56) References Cited

U.S. PATENT DOCUMENTS

| | | |
|---|---|---|
| 10,353,905 B2 | 7/2019 | Ramachandran et al. |
| 10,354,264 B2 | 7/2019 | Jagota et al. |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,493 B2 | 2/2020 | Merity et al. |
| 10,573,295 B2 | 2/2020 | Zhou et al. |
| 10,592,767 B2 | 3/2020 | Trott et al. |
| 10,614,393 B2 | 4/2020 | Jagota et al. |
| 10,699,060 B2 | 6/2020 | McCann et al. |
| 10,747,761 B2 | 8/2020 | Zhong et al. |
| 10,776,581 B2 | 9/2020 | McCann et al. |
| 10,783,875 B2 | 9/2020 | Hosseini-Asl et al. |
| 2016/0140355 A1 | 5/2016 | Jagota et al. |
| 2016/0350653 A1 | 12/2016 | Socher et al. |
| 2017/0024641 A1* | 1/2017 | Wierzynski .......... G06N 3/0454 |
| 2017/0024645 A1 | 1/2017 | Socher et al. |
| 2017/0060919 A1 | 3/2017 | Ramachandran et al. |
| 2017/0083829 A1* | 3/2017 | Kang .................... G06N 3/0454 |
| 2018/0025271 A1* | 1/2018 | Sawada .................... G06N 3/04 706/25 |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0268287 A1 | 9/2018 | Johansen et al. |
| 2018/0268292 A1* | 9/2018 | Choi ........................ G06N 3/08 |
| 2018/0268298 A1 | 9/2018 | Johansen et al. |
| 2018/0336453 A1 | 11/2018 | Merity et al. |
| 2018/0373682 A1 | 12/2018 | McCann et al. |
| 2018/0373987 A1 | 12/2018 | Zhang et al. |
| 2019/0130248 A1 | 5/2019 | Zhong et al. |
| 2019/0130312 A1 | 5/2019 | Xiong et al. |
| 2019/0130896 A1 | 5/2019 | Zhou et al. |
| 2019/0138653 A1 | 5/2019 | Roller et al. |
| 2019/0140995 A1 | 5/2019 | Roller et al. |
| 2019/0213482 A1 | 7/2019 | Socher et al. |
| 2019/0244604 A1* | 8/2019 | Masataki .............. G10L 15/063 |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0272335 A1 | 9/2019 | Liu et al. |
| 2019/0286073 A1 | 9/2019 | Hosseini-Asl et al. |
| 2019/0286832 A1 | 9/2019 | Szeto et al. |
| 2019/0355270 A1 | 11/2019 | McCann et al. |
| 2019/0362020 A1 | 11/2019 | Paulus et al. |
| 2019/0362246 A1 | 11/2019 | Lin et al. |
| 2020/0005765 A1 | 1/2020 | Zhou et al. |
| 2020/0057805 A1 | 2/2020 | Lu et al. |
| 2020/0065651 A1 | 2/2020 | Merity et al. |
| 2020/0084465 A1 | 3/2020 | Zhou et al. |
| 2020/0089757 A1 | 3/2020 | Machado et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0153765 A1 | 5/2020 | Burbank et al. |
| 2020/0153934 A1 | 5/2020 | Burbank et al. |
| 2020/0175305 A1 | 6/2020 | Trott et al. |
| 2020/0184020 A1 | 6/2020 | Hashimoto et al. |
| 2020/0272940 A1 | 8/2020 | Sun et al. |
| 2020/0285704 A1 | 9/2020 | Rajani et al. |
| 2020/0285705 A1 | 9/2020 | Zheng et al. |
| 2020/0285706 A1 | 9/2020 | Singh et al. |
| 2020/0285993 A1 | 9/2020 | Liu et al. |
| 2020/0301925 A1 | 9/2020 | Zhong et al. |
| 2020/0302178 A1 | 9/2020 | Gao et al. |
| 2020/0302236 A1 | 9/2020 | Gao et al. |
| 2022/0215209 A1* | 7/2022 | Luong .................... G06N 3/044 |

OTHER PUBLICATIONS

Yim, J., Joo, D., Bae, J. and Kim, J., 2017. A gift from knowledge distillation: Fast optimization, network minimization and transfer learning. In Proceedings of the IEEE conference on computer vision and pattern recognition (pp. 4133-4141). (Year: 2017).*

Sau BB, Balasubramanian VN. Deep model compression: Distilling knowledge from noisy teachers. arXiv preprint arXiv:1610.09650. Oct. 30, 2016. (Year: 2016).*

Lezama J, Qiu Q, Musé P, Sapiro G. Ole: Orthogonal low-rank embedding—a plug and play geometric loss for deep learning. InProceedings of the IEEE Conference on Computer Vision and Pattern Recognition 2018 (pp. 8109-8118). (Year: 2018).*

Dighe P, Asaei A, Bourlard H. Low-rank and sparse subspace modeling of speech for DNN based acoustic modeling. Speech Communication. May 1, 2019;109:34-45. (Year: 2019).*

Wei J, Zou K. Eda: Easy data augmentation techniques for boosting performance on text classification tasks. arXiv preprint arXiv:1901.11196. Jan. 31, 2019. (Year: 2019).*

Wang X, Pham H, Dai Z, Neubig G. SwitchOut: an efficient data augmentation algorithm for neural machine translation. arXiv preprint arXiv:1808.07512. Aug. 22, 2018. (Year: 2018).*

Kobayashi Y, Yoshida T, Iwata K, Fujimura H, Akamine M. Out-of-domain slot value detection for spoken dialogue systems with context information. In 2018 IEEE Spoken Language Technology Workshop (SLT) Dec. 18, 2018 (pp. 854-861). IEEE. (Year: 2018).*

* cited by examiner

Label: Keynote Agenda

| | word | tfidf prob | id prob | comb prob |
|---|---|---|---|---|
| 0 | when | 0.10833757429152711 | 0.17666276 | 0.16188370603670205 |
| 1 | is | 0.0 | 0.21626382 | 0.0 |
| 2 | the | 0.0 | 0.0 | 0.0 |
| 3 | seminar | 0.07119309190613861 | 0.21724122 | 0.13081545860721677 |
| 4 | for | 0.009121158495616039 | 0.073515095 | 0.005671599411073185 |
| 5 | developers | 0.7624205960302438 | 0.09457094 | 0.6099861700811941,2 |
| 6 | keynote | 0.04892757900447445 | 0.22174627 | 0.09176753133066689 |

FIG. 11

SYSTEMS AND METHODS FOR DISTILLED BERT-BASED TRAINING MODEL FOR TEXT CLASSIFICATION

CROSS REFERENCES

The present disclosure is a non-provisional application of and claims priority under 35 U.S.C. 119 to U.S. Provisional Application No. 62/937,085, filed on Nov. 18, 2019, and U.S. Provisional Application No. 62/968,973, filed on Jan. 31, 2020 which are hereby expressly incorporated herein by reference in their entirety.

The present disclosure is related to U.S. Nonprovisional application Ser. No. 16/877,325, filed on May 18, 2020, which claims priority under 35 U.S.C. 119 to U.S. Provisional Application No. 62/937,079, filed on Nov. 18, 2019, U.S. Provisional Application No. 62/968,959, filed on Jan. 31, 2020, and U.S. Nonprovisional application Ser. No. 16/877,333, filed on May 18, 2020, which claims priority under 35 U.S.C. 119 to U.S. Provisional Application No. 62/937,079, filed on Nov. 18, 2019 and U.S. Provisional Application No. 62/968,959, filed on Jan. 31, 2020 all of which are hereby expressly incorporated herein by reference in their entirety.

TECHNICAL FIELD

The present disclosure relates generally to training and use of machine learning systems and more specifically to systems and methods for distilled training model for text classification.

BACKGROUND

Neural networks have been widely used for data classification, e.g., identifying which class from a set of pre-defined classes that an input data sample may belong to. Bidirectional encoder representation from transformers (BERT) models have been widely used in natural language processing tasks, such as text classification, auto-translation, and/or the like. However, BERT is a large model (around 700 MB) which requires a significantly long training time. BERT is also demanding in hardware resource, usually requiring a graphic processing unit (GPU) for serving. Thus, for some smaller applications such as intent predictions, where a workstation with only a central processing unit (CPU) is available, BERT may not be readily applicable.

BRIEF DESCRIPTION OF THE DRAWINGS

FIG. 11 is a simplified diagram illustrating example importance probabilities of words in an input sample, according to some embodiments.

Figure 1:
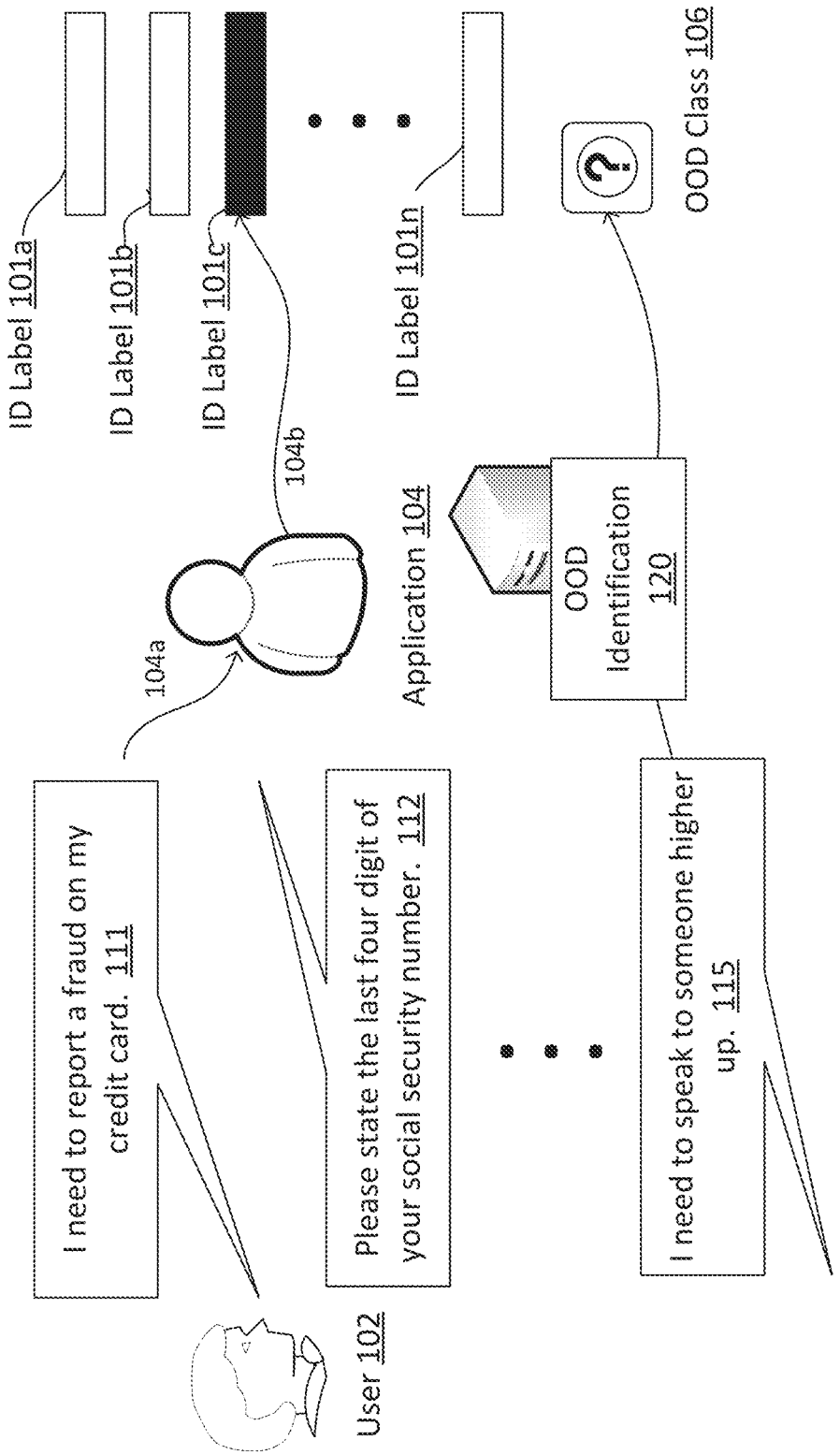
FIG. 1 is a simplified diagram illustrating an example artificial intelligence (AI) application that is built on in-distribution and OOD classification of input samples, according to some embodiments.

In the figures, elements having the same designations have the same or similar functions.

DETAILED DESCRIPTION

In view of the need for a more resource-efficient neural model but with comparable performance with BERT, an embodiment described herein provides a training mechanism that transfers the knowledge from the trained BERT model into a much smaller model to approximate the behavior of BERT. Specifically, the BERT model may be trained with a given intent dataset, which may be treated as a teacher model. A much smaller student model (~10-20 MB) may be trained using input from the same intent dataset and the output from the teacher model to approximate the behavior of the teacher model. As the student model can be trained within a much shorter time than the BERT teacher model, the student model can be supplemented with out-of-distribution (OOD) training. Specifically, OOD samples can be generated from the given intent set, and the student model is assigned with one more class label for an "OOD" class. The OOD samples are then fed to the student model together with inputs from the given intent dataset to train the student model for OOD identification.

In addition, various mechanisms are discussed herein for OOD identification and training. For example, when a digital image is fed to the neural network, the image pixels may be classified as belonging to a set of pre-defined classes, e.g., indicating a shape, a pattern, an object, etc. in the image. Specifically, the neural network generates probabilistic distributions indicating a respective likelihood that the input image may belong to each pre-defined class. However, when the image does not belong to any of the pre-defined classes, the output probabilistic distributions from neural network can be highly inaccurate. In this case, pixels of the input image may be referred to as "out-of-domain" or "out-of-distribution" (OOD), as opposed to "in-domain" or "in-distribution" (ID) when the input image belongs to one of the pre-defined classes.

When the neural network is only trained to classify an input sample into pre-defined classes, the classification output in response to an OOD input can be highly inaccurate and even completely erroneous. Thus, to more accurately classify the input data, an OOD classification scheme is needed to identify inputs that may go beyond the pre-defined classes. However, due to the vast randomness of OOD inputs and the large scale of unseen dataset and domains, OOD identification has proven to be difficult.

In view of the need for an OOD identification scheme with improved accuracy, embodiments described herein provide various training and implementation schemes for OOD detection.

Some existing systems preprocess the input data by adding small perturbations, thus for in-domain examples, a large change in output distribution may be expected even for a small change to the inputs, as against OOD examples. Thus, by measuring the scale of change in outputs, OOD examples may be identified. However, this model is not tractable to compute backpropagation during interference. An embodiment provided herein preprocesses the input samples to the classification neural network, e.g., by adding Gaussian noise to word/sentence representations to make the function of the neural network satisfy Lipschitz property such that a small change in the input does not cause much change to the output if the input sample is in-distribution. In this way, the accuracy of both in-domain and OOD identification can be improved.

Some existing systems uses hyperparameter search in a multidimensional space to classify input vector representations. For example, each pre-defined class is represented by a reference class vector in the multidimensional space, and an input vector representation is determined to belong to a pre-defined class based on the closest reference class vector. However, when only a small training dataset is available, such dataset may not be sufficient for the neural network to learn the hyperparameters for the neural network to separate the multidimensional space with respect to different pre-defined classes. An embodiment described herein provides that a small dataset may be used for the neural network to learn characteristics of the radius of the input vector to the origin. In this way, an OOD vector may be identified when the OOD vector is sufficiently close to the origin (identified through learning), or when the OOD vector is orthogonal to all reference class vectors.

Some existing systems process input samples with a high feature dimension to improve the accuracy of classification. While the in-domain output may be sensitive to the dimensions and higher dimensions of the features may yield better in-domain output accuracy, however, higher feature dimension sometimes may lead to poor performance of OOD detection. For example, certain feature basis which do not contribute to classification may cause long tail accumulation for the OOD output. An embodiment proposed herein uses sparsification techniques to train the neural network with a high feature dimension that may yield desirable in-domain detection accuracy, but may prune away dimensions in the output that are less important. Specifically, a sparsification vector is generated based on Gaussian distribution (or other probabilistic distribution) and is used to multiply with the higher dimension output to reduce the number of feature dimensions. The pruned output may be then used for the neural network to learn the sparsification vector. In this way, OOD detection accuracy can be improved.

In some embodiments, training a neural model for OOD identification may be difficult due to a lack of OOD training samples. An embodiment proposed herein generates OOD training samples by feeding samples that are similar to in-domain samples but are semantically OOD. Specifically, the system may find candidate words in an in-domain sample to be replaced by other words for the sentence to be OOD. For example, in-domain examples may be "what is Mark's keynote?" "When is Mark's keynote?" or "Where is Mark's keynote?" The system may identify that words such as "what" "when" and "where" are the critical words that carry more weight in classifying the sentence into a pre-defined class, and may seek to replace these words with other random words to generate an OOD input, e.g., "Red is Mark's keynote" is an OOD sample.

As used herein, the term "in-distribution" or "in-domain" (the two terms may be used interchangeably herein) refers to a characteristic of a data sample when the data sample belongs to one of a set of pre-defined classes.

As used herein, the term "out-of-distribution" or "out-of-domain" (the two terms may be used interchangeably herein, or as "OOD") refers to a characteristic of a data sample when the data sample does not belong to any of a set of pre-defined classes.

As used herein, the term "network" may include any hardware or software-based framework that includes any artificial intelligence network or system, neural network or system and/or any training or learning models implemented thereon or therewith.

As used herein, the term "module" or "model" may include any hardware or software-based framework that performs one or more functions. In some embodiments, the module may be implemented using one or more neural networks.

Introduction

FIG. 1 is a simplified diagram illustrating an example artificial intelligence (AI) application that is built on in-distribution and OOD classification of input samples, according to some embodiments. As shown in FIG. 1, a chat bot application 104 may communicate with a user 102, who may enter input sentences via a user interface. The chat bot application 104 may employ a neural network model to classify received input sentences from the user 102 according to a set of pre-defined classes, e.g., in-domain labels 101a-n. Based on the classification, the application 104 may in turn generate a response according to the identified label of the user input.

For example, when the user 102 says "I need to report a fraud on my credit card" 111, which is transmitted to the char bot 104 via communication interface 104a, the chat bot 104 may instantiate a neural classification model to classify the user communication 111 as related to the label "fraud" 111c, e.g., at 104b. The chat bot 104 may then retrieve a response that has been pre-defined for fraud handling, such as "please state the last four digits of our social security number" 112.

For another example, when the user says "I need to speak to someone higher up" 115, the chat bot 104 may not be able to identify which pre-defined label 101*a-n* the statement 115 belongs to. In this case, when the chat bot 104 is trained with OOD identification 120, the chat bot 104 may identify the input 115 as OOD, and allow a customer or a provider to define a response to be associated with the OOD class 106, such as reporting an error, or directing the user 102 to a representative, etc.

Therefore, as any random comment made by the user 102 may be an OOD input, such vast randomness may render OOD identification and training of the OOD identification 120 difficult.

Figure 2:
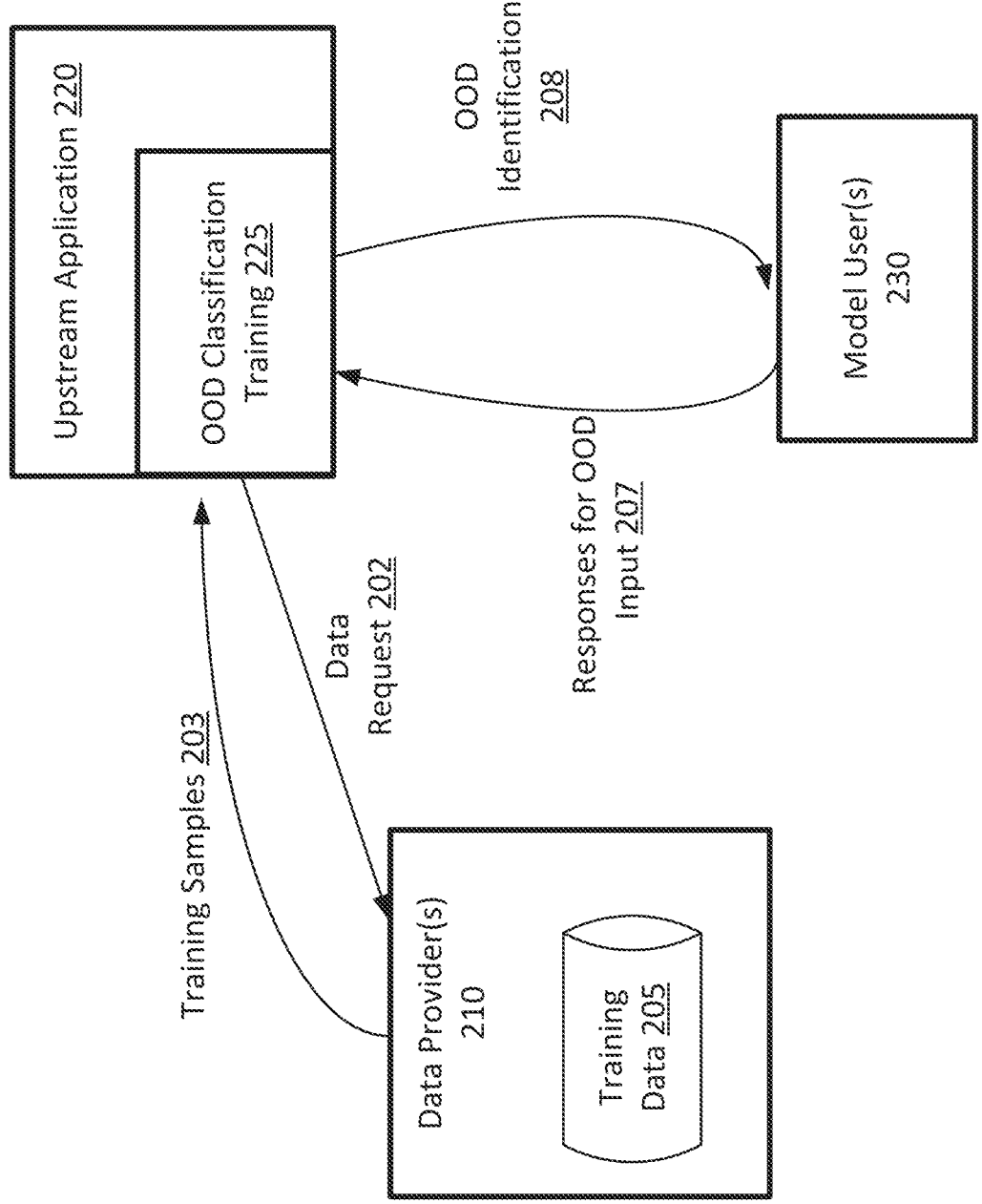
FIG. 2 is a simplified diagram illustrating an example data flow between different entities for a model user to obtain an AI application trained for OOD classification, according to some embodiments.

FIG. 2 is a simplified diagram illustrating an example data flow between different entities for a model user to obtain an AI application trained for OOD classification, according to some embodiments. Data provider(s) 210, an upstream application 220 (e.g., the chat bot application 104 in FIG. 1), and a model user 230 are shown to interact with each other. In some examples, the model user 230 may define a response for an OOD input 207. For example, the upstream application 220 may send OOD identification 208 to the model user 230 when the upstream application 220 receives an OOD input (e.g., user communication 115 in FIG. 1), which may in turn define how the upstream application 220 should respond to such OOD input.

The upstream application 220 may operate an OOD classification training framework 225, which sends a data or model training request 202 to the data provider(s) 210. The data provider 210, which may store a dataset of training data 205, may in turn provide training samples 203 to the OOD classification training module 225.

Figure 3A:
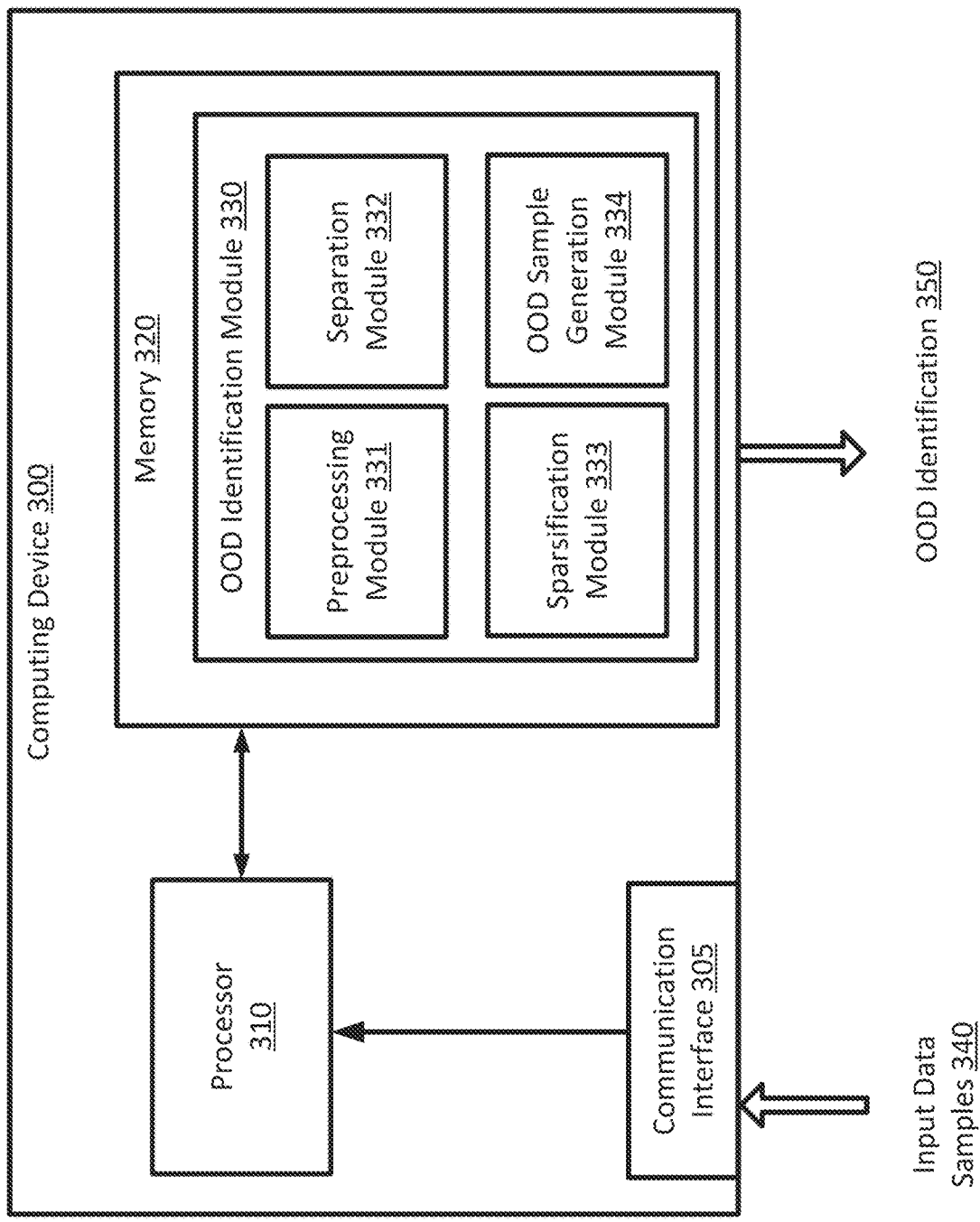
FIG. 3A is a simplified diagram of a computing device implementing the OOD identification framework, according to some embodiments.

FIG. 3A is a simplified diagram of a computing device implementing the OOD identification framework, according to some embodiments. As shown in FIG. 3A, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

Computing device 300 further includes a communication interface 305 that is operable to receive and transmit data to one or more other computing devices, such as the data providers 210. In some examples, data may be sent to or received from the data providers 210 via the communication interface 305.

Memory 320 includes an OOD identification module 330 that may be used to implement a machine learning system and model described further herein and/or to implement any of the methods described further herein. In some examples, the OOD identification module 330 may be trained by the OOD training module 360 in FIG. 3B. In some examples, the OOD identification module 330 may also handle the iterative training and/or evaluation of OOD identification module 330 as is described in further detail below. In some examples, OOD identification module 330 may include a machine learning structure, such as one or more neural networks, deep convolutional networks, and/or the like.

In some examples, memory 320 may include non-transitory, tangible, machine readable media that includes executable code that when run by one or more processors (e.g., processor 310) may cause the one or more processors to perform the methods described in further detail herein. In some examples, each of the OOD identification modules 330 and/or OOD training module 360 may be implemented using hardware, software, and/or a combination of hardware and software. As shown, computing device 300 receives an input batch of data samples 340 and generates a classification output which may include OOD identification 350.

The OOD identification module 330 includes a number of submodules such as the preprocessing module 331, the separation module 332, the sparsification module 333 and the OOD sample generation module 334. The preprocessing module 331 is configured to receive and preprocess the input data samples 340 by adding a Gaussian noise component to each input data sample at the word or sentence level to render the input-output transformation function with a Lipschitz property. Further details and implementations of the preprocessing module 331 are discussed in relation to FIGS. 4-5.

The separation module 332 is configured to learn characteristics of the vector representations of in-distribution and OOD input samples from the penultimate layer, as compared against reference class vectors geometrically separating a multi-dimensional space. The separation module 332 is then configured to use the learned characteristics to distinguish in-distribution or OOD inputs. Further details and implementations of the separation module 332 are discussed in relation to FIGS. 6-7.

The sparsification module 333 is configured to train the OOD identification module 330 with a higher feature dimension, but then prune away feature dimensions that are less important in the classification outputs, in order to enhance hardware resource efficiency. Further details and implementations of the sparsification module 333 are discussed in relation to FIGS. 8-10.

The OOD sample generation module 334 is configured to generate OOD training samples from in-distribution training samples, e.g., by feeding sentences that are similar to in-distribution samples but are semantically OOD to train the OOD identification module 330. Further details and implementations of the sparsification module 333 are discussed in relation to FIGS. 11-13.

Figure 3B:
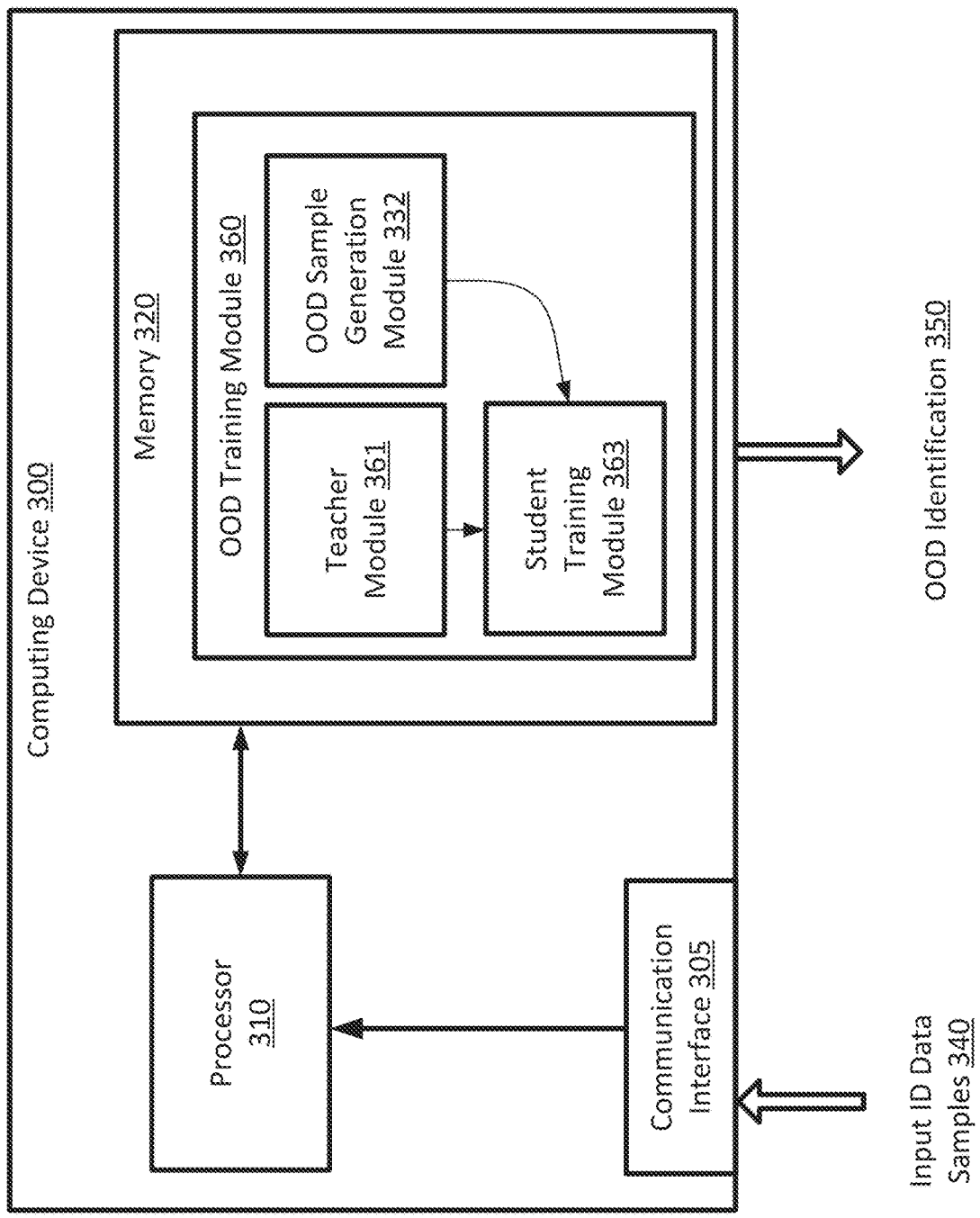
FIG. 3B is a simplified diagram of a computing device implementing the OOD training framework, according to some embodiments.

FIG. 3B is a simplified diagram of a computing device implementing the OOD training framework, according to some embodiments. In some embodiments, the OOD training module 360 may be housed within the same memory 320 as part of the same computing device 300 as the OOD identification module 330 in FIG. 3A.

The OOD training module 360 may include submodules such as a teacher module 361, a student training module 363 and an OOD sample generation module 332. The teacher module 361 may include a Bidirectional encoder representation from transformers (BERT) model, embeddings from language models (ELMo), and/or the like, which are configured to perform various natural language processing tasks such as classification, text prediction, auto-translation, ad/or the like. The student training module 363 is configured to be trained using the same inputs that are fed to the teacher module 361 and the outputs from the teacher module 361 to approximate the behavior of the teacher module 361. Further details and implementations of the teacher module 361 and the student module 363 are discussed in relation to FIGS. 14-16.

The OOD sample generation module 332 may be configured to provide OOD training samples from a given dataset that is configured to provide in-distribution input samples 340. The OOD sample generation module 332 may then feed the generated OOD training samples to the student training module 363.

In addition, the various modules discussed in FIG. 3A, such as the preprocessing module 331, the separation module 332, the sparsification module 333, may all be used to operate concurrently with the student training module 363. For example, the preprocessing module 331 is configured to preprocess the input data samples to the student training module 363. The separation module 332 may be configured to learn characteristics of the vector representations of in-distribution and OOD input samples from the penultimate layer of the student training module 363. The sparsification module 333 may be configured to train the student module 363 with inputs of a higher feature dimension, but then prune away feature dimensions that are less important in the classification outputs, in order to enhance hardware resource efficiency.

As discussed above and further emphasized here, FIGS. 3A-3B are merely an example which should not unduly limit the scope of the claims. One of ordinary skill in the art would recognize many variations, alternatives, and modifications. According to some embodiments, one or more of the one or more OOD identification module 330 may be located in one or more computing devices separate from computing device 300. In some examples, the separate computing devices may be consistent with computing device 300. In some examples, the one or more OOD training modules 360 may be located in its own separate computing device from the OOD identification module 330.

Lipschitz Preprocessing

For deep neural networks (DNNs) that are trained for classification, when the DNNs are robust to adversarial inputs, such DNNs perform better for OOD tasks as compared to DNNs that are not robust to adversarial inputs. A property of DNNs that are robust to adversarial inputs is that such DNNs learn functions that are Lipschitz tight, e.g., given different inputs x, y, the outputs $f(x)$ and $f(y)$ satisfies a property that $\|f(x)-f(y)\| < C \|x-y\|$, where $f(\ )$ represents the function corresponding to the DNN, and C is a constant. In one embodiment, Gaussian noise may be added to the inputs x, y to make the function $f(\ )$ of the DNN Lipschitz tight.

Figure 4:
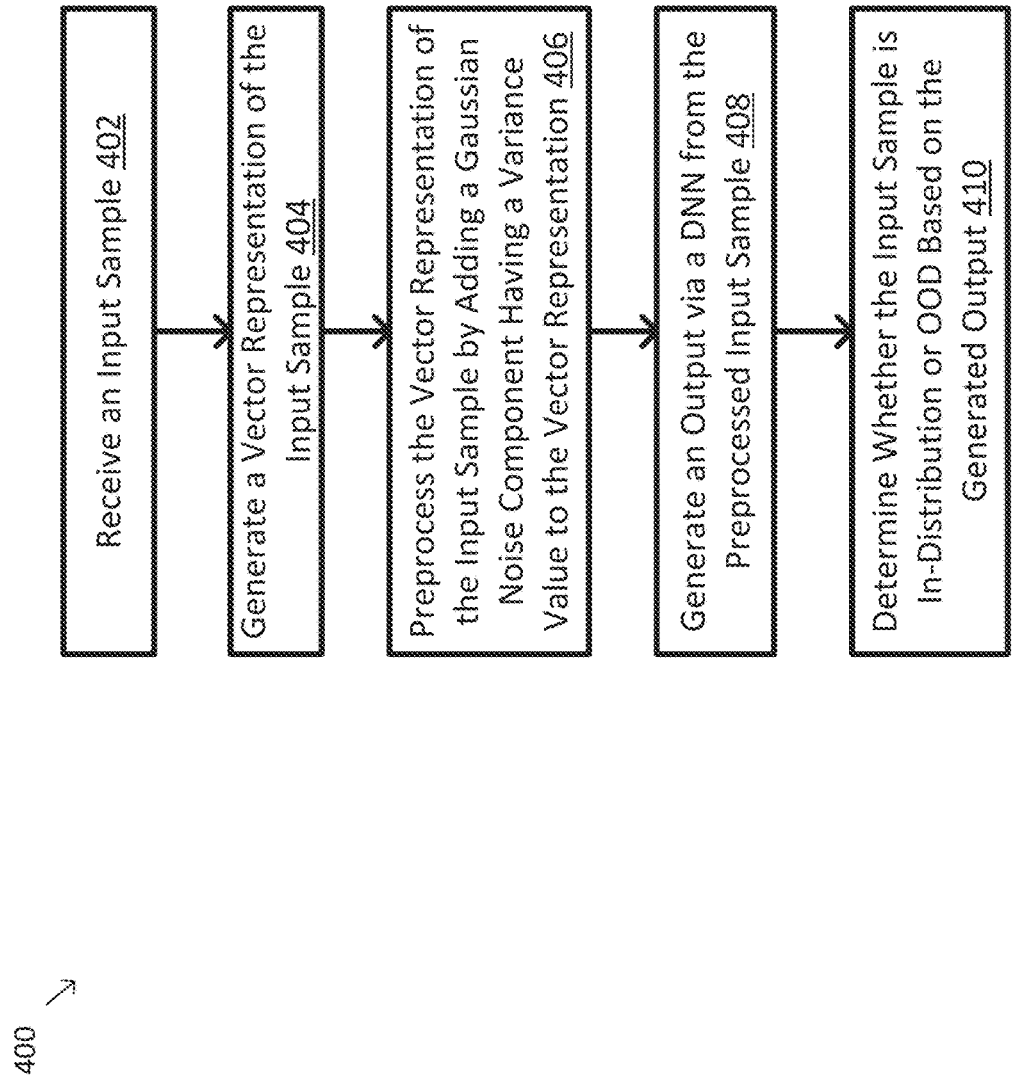
FIG. 4 is a simplified logic flow diagram of a method for OOD identification with preprocessed input samples, according to some embodiments.

FIG. 4 is a simplified logic flow diagram of a method for OOD identification with preprocessed input samples, according to some embodiments. One or more of the processes 402-410 of method 400 may be implemented, at least in part, in the form of executable code stored on non-transitory, tangible, machine-readable media that when run by one or more processors (e.g., processor 310) may cause the one or more processors to perform one or more of the processes 402-410. In some embodiments, method 400 may correspond to the methods used by the OOD identification module 330 via the preprocessing module 331.

At step 402, an input sample may be received, e.g., input samples 340 may be received via communication interface 305 shown in FIG. 3A. In some embodiments, the input sample may be a natural language sentence such as 111 or 115 in FIG. 1.

At step 404, a vector representation of the input sample may be optionally generated.

At step 406, the vector representation of the input sample may be preprocessed by adding a Gaussian noise component having a variance value to the vector representation such that the resulting input-output function of the neural network satisfies the Lipschitz property. For example, the Gaussian noise may be added at the word level or at the sentence level of the input sample. For each language, the variance of the Gaussian noise is estimated and learned via backpropagation to render the learned function of the neural network Lipschitz tights.

At step 408, a classification output is then generated from the neural network from the preprocessed input sample. For example, the output may take a form as classification probabilities indicating a likelihood that the input sample belongs to a pre-defined class or is OOD.

At step 410, the neural network determines whether the input sample is in-distribution or out-of-distribution based on the generated classification output. For example, a pre-defined threshold may be used to determine whether the input sample is in-distribution or OOD depending on whether a classification probability is greater or less than the pre-defined threshold.

In some embodiments, with input samples obtained from a training dataset (e.g., 205 in FIG. 2), method 400 may be repeated to train the neural network using a loss computed from the classification output generated from the preprocessed input sample. In some embodiments, the preprocessing with Gaussian noise may be performed only during the training phase. The expectation is that the in-domain and ODD performance of the trained neural network is not affected by the added Gaussian noise.

Figure 5:
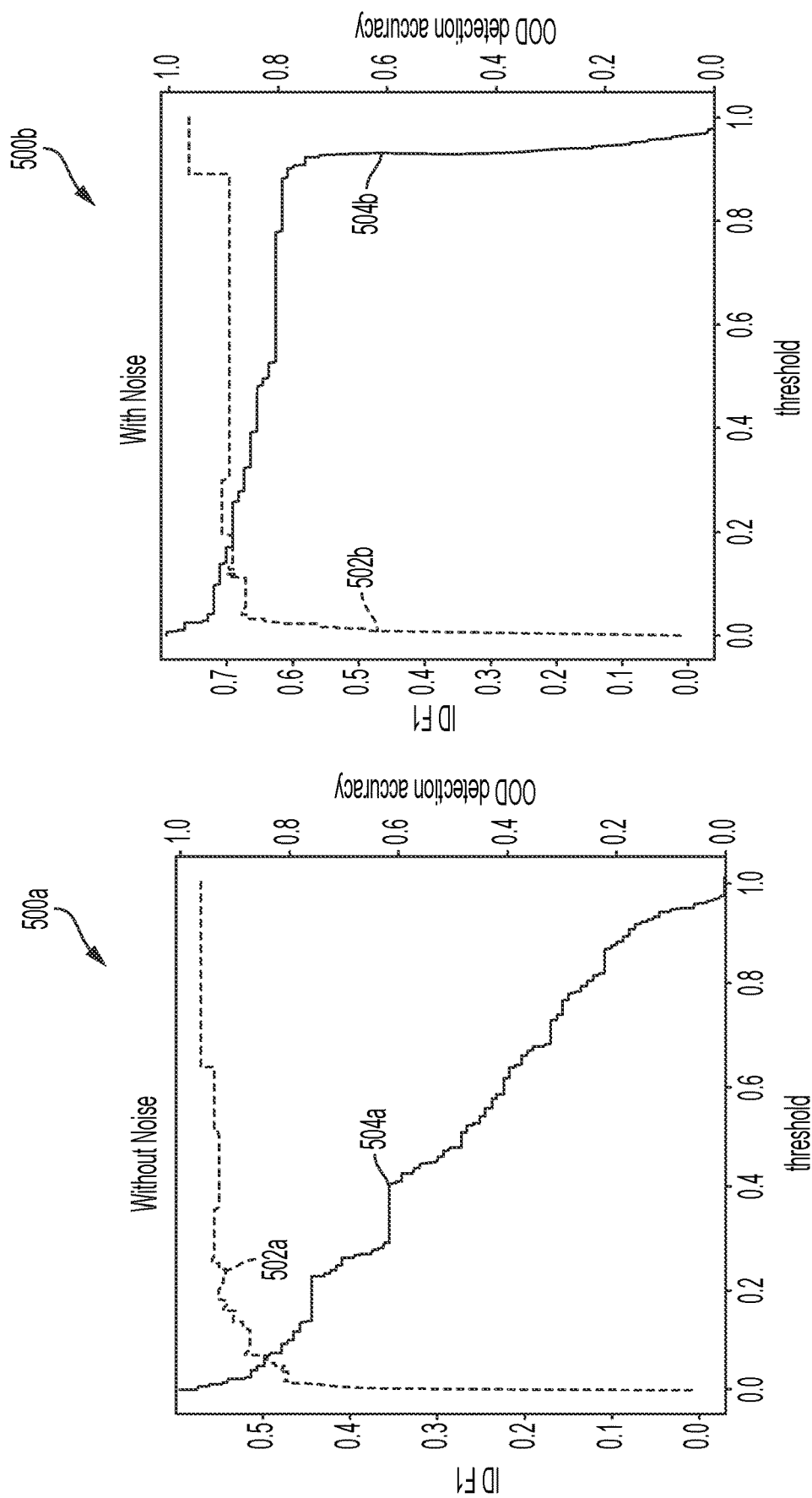
FIG. 5 is a diagram of performance data plots of OOD and in-distribution identification accuracy with or without pre-processing with added noise discussed in relation to FIG. 4, according to some embodiments.

FIG. 5 is a diagram of performance data plots of OOD and in-distribution identification accuracy with or without preprocessing with added noise discussed in relation to FIG. 4, according to some embodiments. Data plots 500a and 500b shows comparisons of OOD identification performance (measured by accuracy, shown by curve 504a in data plot 500a and 504b in data plot 500b) and in-distribution identification performance (measured by F1 score, shown by curve 502a in data plot 500a and 502b in data plot 500b) without added noise and with added noise, respectively, against OOD probability (the x-axis).

As shown by 500a-b, with added noise, for a much broader range of OOD probabilities on the x-axis, the OOD performance 504b and the in-distribution performance 502b achieve a better performance level than the OOD performance 504a and the in-distribution performance 502a. Therefore, the preprocessing with added Gaussian noise to the input samples may improve both the in-distribution and OOD performance of the neural network.

Separation of OOD Vectors

When OOD examples are passed through a DNN at the penultimate layer right before the final softmax layer, the representation from the penultimate layer tend to be closer to the origin when compared to those of in-domain counterparts. The OOD example may thus be forced to be closer to the origin by training the DNN with random OOD examples and penalizing the penultimate layer outputs if they are a pre-defined distance away from the origin. This technique requires a couple of hyper-parameters to be tuned to achieve optimal performance. To tune these hyper-parameters, some of the training data needs to be set aside. As training data can be scarce, hyper-parameter tuning may not always be feasible. Instead of hyper-parameter tuning, the characteristics of the OOD samples while passing through the penultimate layer can be utilized to identify the OOD samples, e.g., an OOD representation at the penultimate layer can be either closed to the origin or on a plane that is orthogonal to all the in-domain classes.

Figure 6:
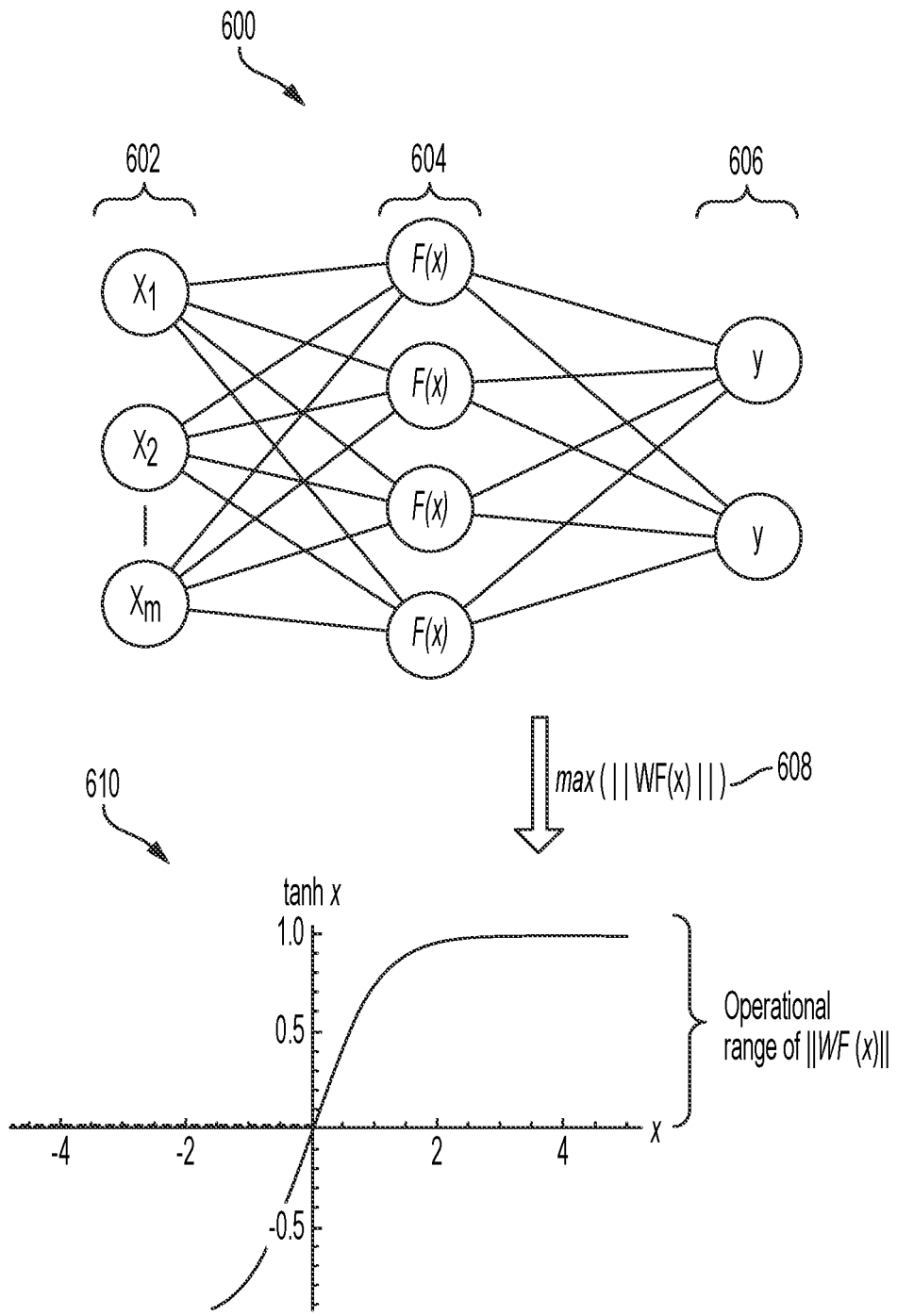
FIG. 6 is a simplified diagram illustrating OOD identification via a deep convoluted neural network (DCNN) using separation of reference class vectors in a low sample regime, according to some embodiments.

FIG. 6 is a simplified diagram illustrating OOD identification via a deep convoluted neural network (DCNN) 600 using separation of reference class vectors in a low sample regime, according to some embodiments. DCNN 600 is shown with an input layer 602 receiving input samples $X_1 \ldots X_m$, one or more hidden layer(s) 604 that transforms the input samples with a function $F(\ )$, and the output layer 606 that generates the output Y. When the DCNN 600 is trained with OOD samples, characteristics of the output of the penultimate layer, referred to as the representation of the penultimate layer, $F(x)$ entails that the ODD example would have a representation to be either close to the origin or any plane that is orthogonal to the representations of all the in-domain classes.

Specifically, at the output layer 606, the classification output may be computed as:

$$P(Y|ID,X) = \text{softmax}(WF(x)), P(ID|X) = \tan h(\max(\|WF(x)\|))$$

$$P(Y,ID|X) = P(Y|ID,X)P(ID|X)$$

$$P(Y|X) = P(Y,ID|X)P(ID|X)$$

where W is a kernel of weights that may be learned, $F(x)$ is the output of the penultimate layer, ID stands for the condition that input x belongs to an in-domain class. In other words, the pre-defined classes may be viewed as sub-spaces separated by a set of reference class vectors in a multi-dimensional space. The vector representation $F(x)$ from the penultimate layer is compared with the reference class vectors to determine whether $F(x)$ belongs to a particular reference class, e.g., when $F(x)$ is the closest to the particular reference class vector. In particular, $\max(\|WF(x)\|)$ computed at 608 computes the minimum angle made by the representation $(F(x))$ of an input x against an in-domain class representation that is the closest to the vector $F(x)$. The tan h(.) transformation, as shown in diagram 610, transforms this distance $\max(\|WF(x)\|)$ to the origin to a probability distribution of value between 0 and 1, and this probability indicates whether the given input x is in-domain or OOD.

Specifically, the loss function may be computed as $$\text{loss} = -Y \log(P(Y|X))$$

which may be used to learn the kernel of weights W.

Figure 7:
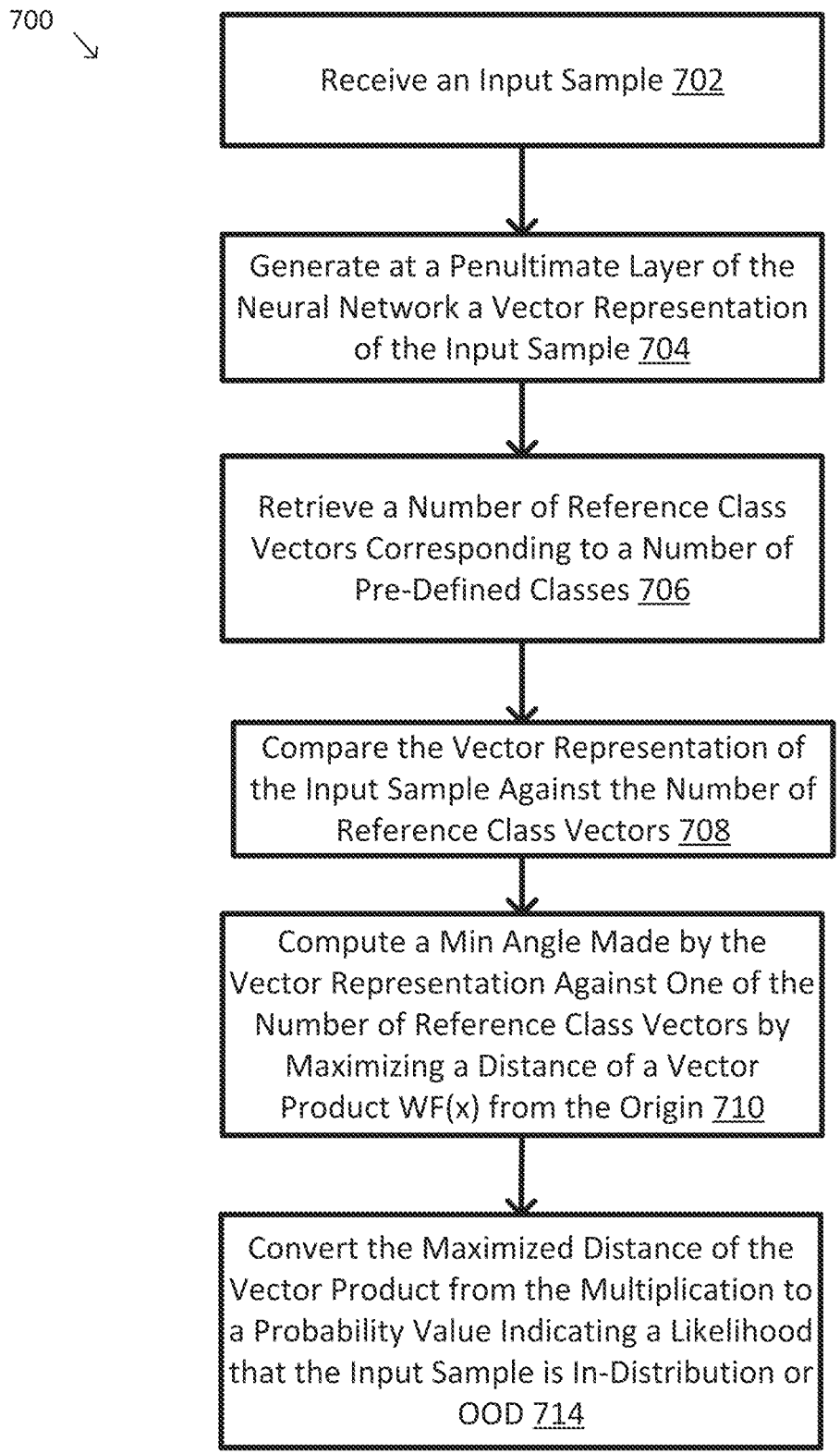
FIG. 7 is a simplified logic flow diagram of a method for OOD identification using separations of reference class vectors in a low sample regime, according to some embodiments.

FIG. 7 is a simplified logic flow diagram of a method for OOD identification using separations of reference class vectors in a low sample regime, according to some embodiments. One or more of the processes 702-714 of method 700 may be implemented, at least in part, in the form of executable code stored on non-transitory, tangible, machine-readable media that when run by one or more processors (e.g., processor 310) may cause the one or more processors to perform one or more of the processes 702-714. In some embodiments, method 700 may correspond to the methods used by the OOD identification module 330 via the separation module 332.

At step 702, an input sample may be received, e.g., input samples 340 may be received via communication interface 305 shown in FIG. 3A. In some embodiments, the input sample may be a natural language sentence such as 111 or 115 in FIG. 1.

At step 704, a vector representation of the input sample may be generated at a penultimate layer of the neural network, e.g., the vector $F(x)$ generated at layer 604 of DNN 600 shown in FIG. 6.

At step 706, a number of reference class vectors corresponding to a number of pre-defined classes are retrieved. For example, the pre-defined classes may be viewed as sub-spaces separated by a set of reference class vectors in a multi-dimensional space.

At step 708, the vector representation of the input sample is compared against the number of reference class vectors. For example, the vector representation $F(x)$ from the penultimate layer is compared with the reference class vectors to determine whether $F(x)$ belongs to a particular reference class, e.g., when $F(x)$ is the closest to a particular reference class vector.

At step 710, the minimum angle made by the vector representation $(F(x))$ of an input x against an in-domain class representation that is the closest to the vector $F(x)$ is computed by maximizing a distance of the vector product $WF(x)$, e.g., $\max(\|WF(x)\|)$.

At step 714, the maximized distance of the vector product $WF(x)$ is converted to a probability value indicating a likelihood that the input sample is in-distribution or OOD. For example, a tan h(.) operation is applied to transform the distance $\max(\|WF(x)\|)$ to a probability distribution of value between 0 and 1, and this probability indicates whether the given input x is in-domain or OOD. Based on the probability, it can be determined whether the input sample is in-distribution or OOD. In particular, when the vector representation of the input sample $F(x)$ is orthogonal to the number of reference class vectors or is close to the origin for less than a pre-defined threshold distance, the input sample x may be determined to be OOD.

Feature Dimension Sparsification

For a DNN, the representation learnt by the DNN for each pre-defined class does not usually require all the allocated hidden feature dimension. Barring a few feature dimensions may not impair classification performance due to the existence of noise that may has already impeded the ODD performance. Thus, after training a DNN with pre-defined classifiers, the weights for feature dimensions that do not contribute to identifying an in-domain class can be set to zero, which does not affect the classification performance significantly.

Specifically, while inputs with a higher dimension may result in better in-domain classification performance of the DNN, the higher dimension can also yield a poor performance for OOD detection accuracy. Basis (dimensions) that do not contribute to classification gets used by $\|F(X)W\|$ (a case of long tail accumulation of bias), where X is the input, $F(X)$ is the DNN function approximator just before the final layer, and W is the weight of the final feature layer. Thus, the DNN may be trained with a higher dimension but may prune away basis/dimensions that are less important.

Figure 8:
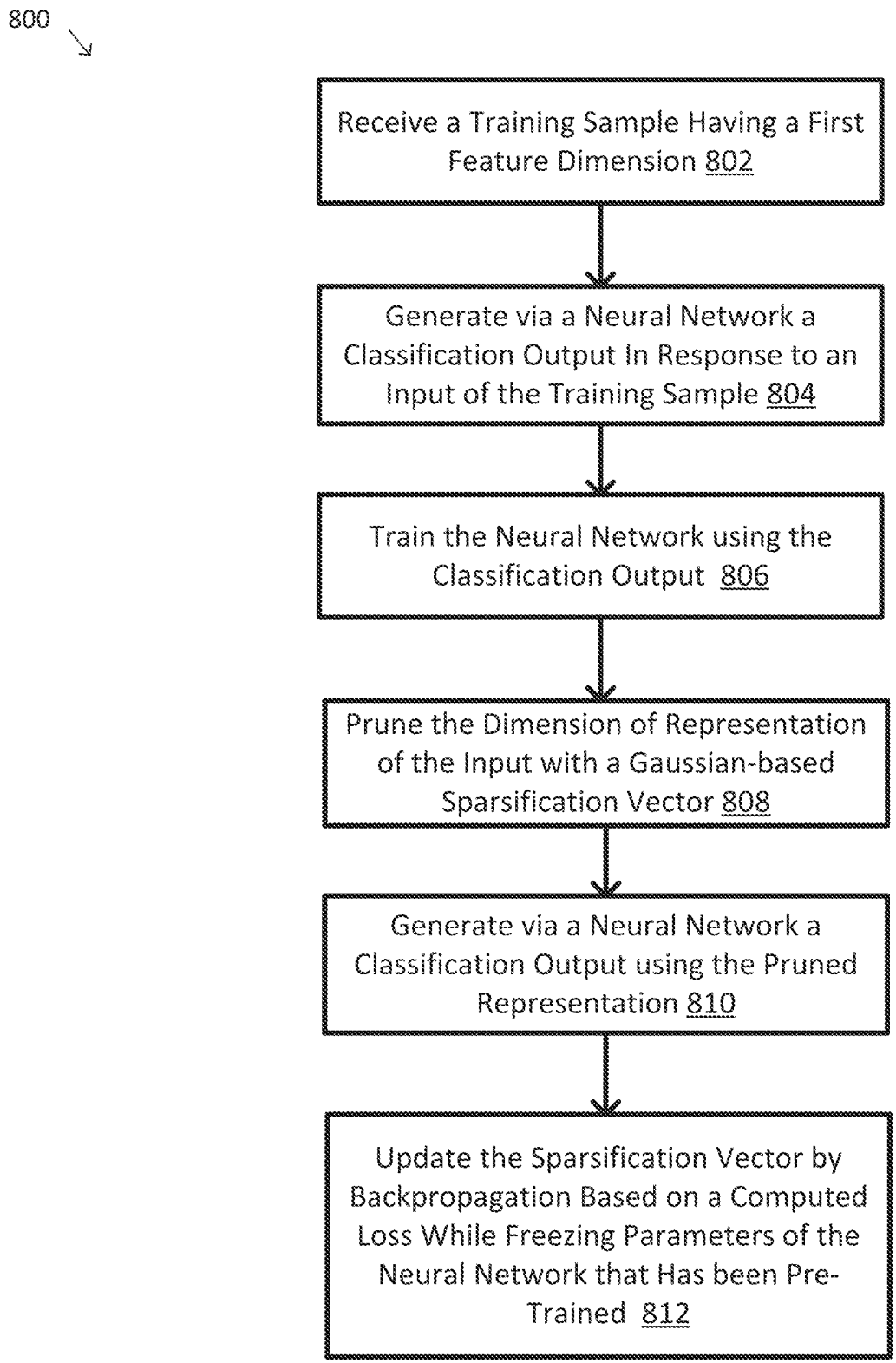
FIG. 8 is a simplified logic flow diagram of a method for OOD training and using sparsification to reduce the dimension of classification outputs, according to some embodiments.

FIG. 8 is a simplified logic flow diagram of a method 800 for OOD training and using sparsification to reduce the dimension of classification outputs, according to some embodiments. One or more of the processes 802-810 of method 800 may be implemented, at least in part, in the form of executable code stored on non-transitory, tangible, machine-readable media that when run by one or more processors (e.g., processor 310) may cause the one or more processors to perform one or more of the processes 802-810. In some embodiments, method 800 may correspond to the methods used by the OOD identification module 330 via the sparsification module 333.

At step 802, an input training sample having a first feature dimension may be received, e.g., input samples 340 may be received via communication interface 305 shown in FIG. 3A. In some embodiments, the input sample may be a natural language sentence such as 111 or 115 in FIG. 1.

At step 804, a classification output is generated, via the neural network, in response to an input of the training sample.

At step 806, the neural network is trained using the classification output to obtain a set of parameters for the neural network.

At step 808, the dimension of the representation of the input is pruned with a Gaussian-based sparsification vector. For example, a sparse kernel of weights $S=\sigma(F(x)\odot 0, temp)$, which is generated with a Gaussian distribution having a variance based on the input x. Here, $\sigma()$ is a sigmoid function, O is a null vector, the parameter temp means a temperature parameter, which is a hyper parameter set to a value <1. $F(x) \in R^d$ and $S \in R^{d \times c}$, where d is the hidden dimension of the penultimate layer of the DNN classifier and c is the number of in-domain classifiers of the dataset. This temperature parameter forces the sigmoids to discretely select the linearly independent basis of the class representation for discriminating one class against another—in this way, the unused or noisy dimensions of the representation of each in-domain class may be set to zero.

At step 810, a classification output can be generated using the neural network with the trained set of parameters based on the pruned representation. For example, the classification probabilities may be represented as:

$$P(Y|X) = \text{softmax}(F(X)^T(W \odot S))$$

where X represents the input, Y represents the classification output, W represents the vector of weight of the feature layer and $W \in R^{d \times c}$, and the $\odot$ operation represents the Hadamard product.

At step 812, the sparsification vector may be updated by backpropagation based on a computed loss based on the output while freezing parameters of the neural network that has been trained from step 806. For example, a cross-entropy loss may be computed by:

$$\text{Loss} = \text{Cross Entropy}(P(Y|X)) = -Y \log(P(Y|X))$$

which may be backpropagated to update the vector S.

Figure 9:
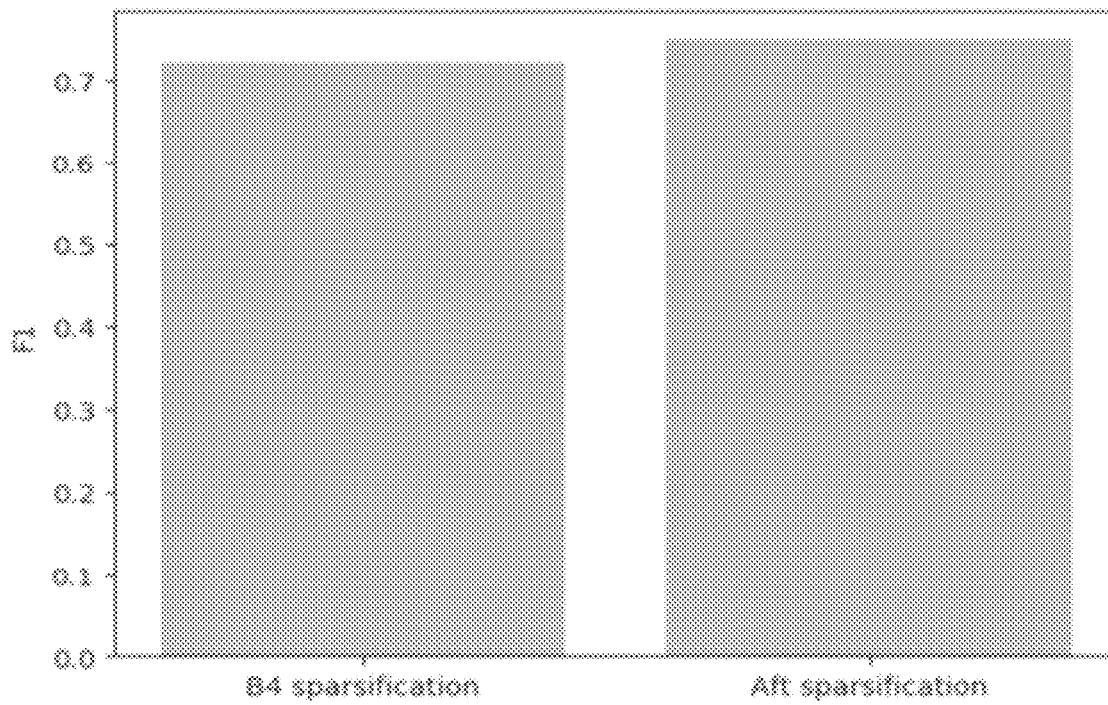
FIG. 9 is a simplified diagram of performance data plots illustrating the in-distribution identification accuracy before and after sparsification of classification outputs, according to some embodiments.

FIG. 9 is a simplified diagram of performance data plots illustrating the in-distribution identification accuracy before and after sparsification of classification outputs, according to some embodiments. The in-distribution identification accuracy is measured by the F1 score. As shown in FIG. 9, the in-distribution F1 scores of a DNN before and after sparsification are comparable. Thus, sparsification does not significantly affect the in-distribution identification performance.

Figure 10:
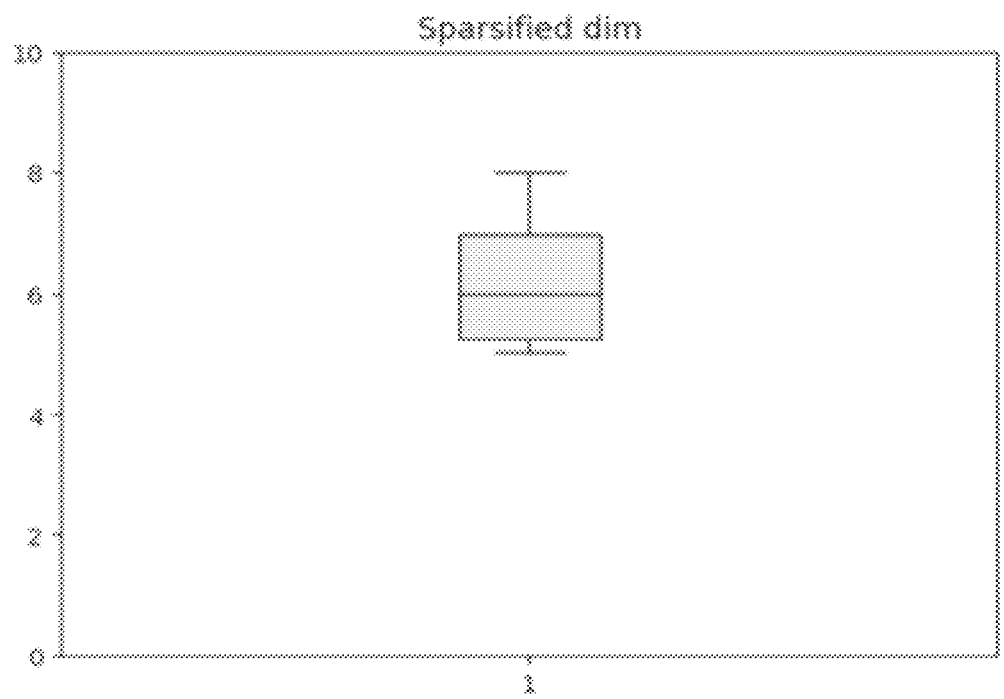
FIG. 10 is a simplified diagram illustrating reduced dimension of classification outputs, according to some embodiments.

FIG. 10 is a simplified diagram illustrating reduced dimension of classification outputs, according to some embodiments. As shown in FIG. 10, an original feature dimension before sparsification of 30 may be shortened to less than 4, significantly improving computational complexity and resource efficiency.

OOD Sample Generation

Classification DNNs may be trained with a training dataset, e.g., see training dataset 205 in FIG. 2, where the training samples may be mostly in-domain. Such in-domain samples may not be ideal in training the DNN for OOD detection. In some embodiments, input samples that are similar to the in-domain samples but are semantically OOD can be used to train the DNN for OOD detection. In this case, candidate words in an in-domain example need to be replaced with random words to become an OOD sample, which may be implemented by learning a clear separation boundary between in-domain and OOD samples.

FIG. 11 is a simplified diagram illustrating example importance probabilities of words in an input sample, according to some embodiments. FIG. 11 shows an example in-domain input sample containing words "when is the seminar for developers keynote," which has been classified as belonging to a pre-defined class "Keynote Agenda." Word importance probabilities for each word are provided to show how each word contributes to the classification of the specific label "Keynote Agenda."

For example, an inter-class word importance probability is computed for each word based on term frequency-inverse document frequency (TF-IDF) of the respective word in the set of in-distribution training samples, e.g., the TF-IDF probabilities shown in FIG. 11. The TF-IDF behavior can thus be learnt to identity which words of the input sentence discriminate one pre-defined class against another pre-defined class, e.g., the higher the TF-IDF probability is, the more discriminatory the word is. In this example, words such as "seminar" and "developers" are considered to be the most discriminatory as having high TF-IDF probabilities.

For another example, an in-distribution word importance probability is computed for each word, which differentiates an in-distribution sample and an out-of-distribution sample for the respective element, e.g., the ID probabilities shown in FIG. 11. The ID probabilities may help to learn a discriminator model on the in-domain and random OOD data, e.g., the higher the ID probability is, the more likely the word contributes to an in-domain classification. In this example, words such as "when," "is," "seminar," "keynote" are more likely to appear in an in-domain sample.

A combined probability can thus be computed based on the TF-IDF based probability (a probability obtained by normalizing class-based TF-IDF word scores across the input sentence) and a word level in-domain probability (which is obtained by training a linear classifier with in-domain examples and random out-of-domain examples, e.g., random examples from Internet sources). The word-level in-domain probability may represent a probability that when the respective word candidature is replaced with a random word, e.g., from a corpus like Wikipedia, the resulting new sentence may become an OOD sample. In some embodiment, the combined probability may be computed based on a weighted sum of the TF-IDF probability and the in-domain probability. The combined probability is obtained by multiplying the TF-IDF based probability for each word in the sentence with corresponding word level in-domain probability.

For example, given the in-domain input sentence "when is the seminar for developers keynote," the words "when," "developers" and "seminar" are good candidate for replacement with random words. If one or more of these words are replaced with random words to form a new sentence, e.g., "how is the game for apple keynote," the resulting generated sentence may take a similar sentence structure to the original in-domain sentence but semantically it is an OOD sentence, because it no longer makes sense in the category of class "Keynote Agenda." Thus, for each in-domain training sentence, one or more OOD sentences can be generated, which can be used as OOD training samples to train the DNN for OOD detection.

Figure 12:
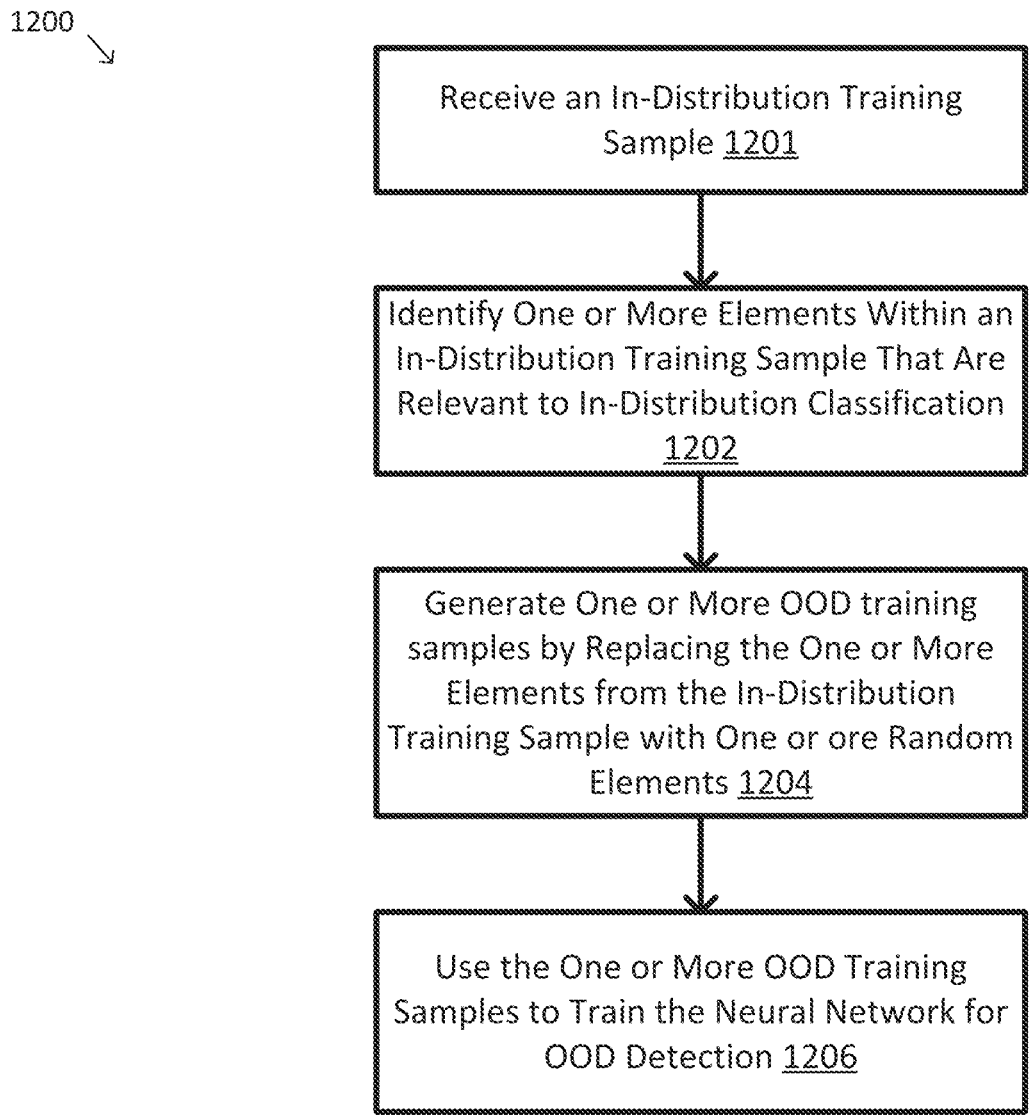
FIG. 12 is a simplified logic flow diagram illustrating a method for OOD classification training with OOD samples generated from in-distribution samples, according to some embodiments.

FIG. 12 is a simplified logic flow diagram illustrating a method for OOD classification training with OOD samples generated from in-distribution samples, according to some embodiments. One or more of the processes 1201-1206 of method 1200 may be implemented, at least in part, in the form of executable code stored on non-transitory, tangible, machine-readable media that when run by one or more processors (e.g., processor 310) may cause the one or more processors to perform one or more of the processes 1201-1206. In some embodiments, method 400 may correspond to the methods used by OOD training module 360 via the OOD sample generation module 334.

At step 1201, an in-distribution input training sample may be received, e.g., input samples 340 may be received via communication interface 305 shown in FIG. 3A. In some embodiments, the input sample may be a natural language sentence such as 111 in FIG. 1.

At step 1202, one or more elements within an in-distribution training sample that are relevant to in-distribution classification based on word importance probabilities may be identified. For example, as discussed in relation to FIG. 11, given the in-domain input sentence "when is the seminar for developers keynote," the words "when," "developers" and "seminar" are good candidate for replacement with random words.

At step 1204, one or more OOD training samples may be generated by replacing the one or more elements from the in-distribution training sample with one or more random elements. For example, the words "when," "developers" and "seminar" may be replaced with random words to form a new sentence, e.g., "how is the game for apple keynote," semantically an OOD sentence.

At step 1206, the generated one or more OOD training samples may be used to train the neural network for OOD detection.

Figure 13:
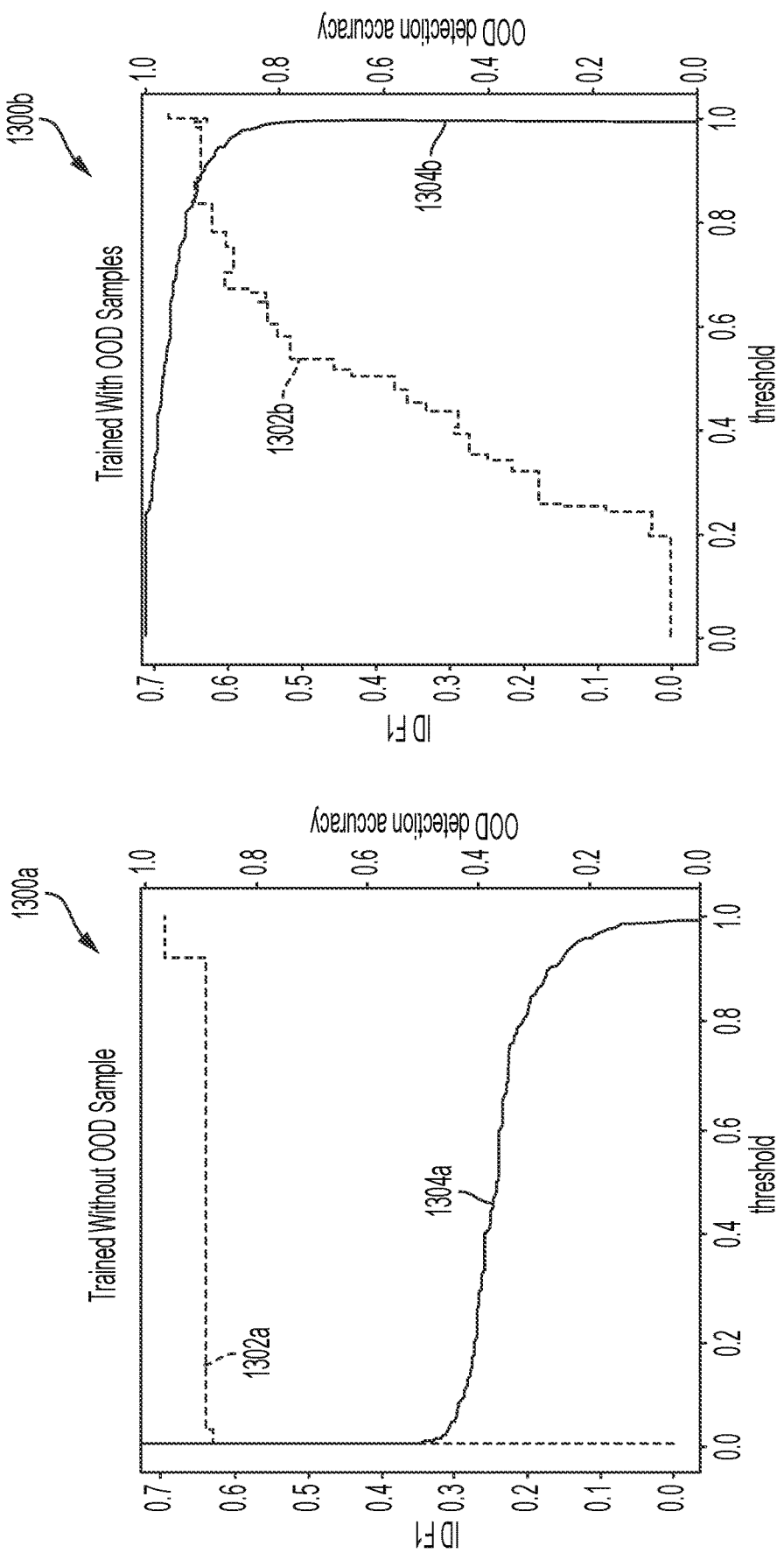
FIG. 13 is a simplified diagram of performance data plots illustrating the in-distribution and OOD identification accuracies with or without OOD samples generated using the method of FIG. 12, according to some embodiments.

FIG. 13 is a simplified diagram of performance data plots illustrating the in-distribution and OOD identification accuracies with or without OOD samples generated using the method of FIG. 12, according to some embodiments. Data plots 1300a and 1300b show comparisons of OOD identification performance (measured by accuracy, shown by curve 1304a in data plot 1300a and 1304b in data plot 1300b) and in-distribution identification performance (measured by F1 score, shown by curve 1302a in data plot 1300a and 1302b in data plot 1300b) trained without OOD samples and with OOD samples, respectively, against OOD probability (the x-axis).

As shown by 1300a-b, with added noise, for a much broader range of OOD probabilities on the x-axis, the OOD performance 1304b and the in-distribution performance 1302b achieve a better performance level than the OOD performance 1304a and the in-distribution performance 1302a. Therefore, by using generated OOD samples from in-domain training data, the combined performance of in-distribution and OOD detection of the neural network is improved.

Distilled BERT Training

In view of the need for a more resource-efficient neural model but with comparable performance with BERT, an embodiment described herein provides a training mechanism that transfers the knowledge from the trained BERT model into a much smaller model to approximate the behavior of BERT. Specifically, the BERT model may be trained with a given intent dataset, which may be treated as a teacher model. A much smaller student model (~10-20 MB) may be trained using input from the same intent dataset and the output from the teacher model to approximate the behavior of the teacher model. As the student model can be trained within a much shorter time than the BERT teacher model, the student model can be supplemented with out-of-distribution (OOD) training. Specifically, OOD samples can be generated from the given intent set, and the student model is assigned with one more class label for an "OOD" class. The OOD samples are then fed to the student model together with inputs from the given intent dataset to train the student model for OOD identification.

Figure 14:
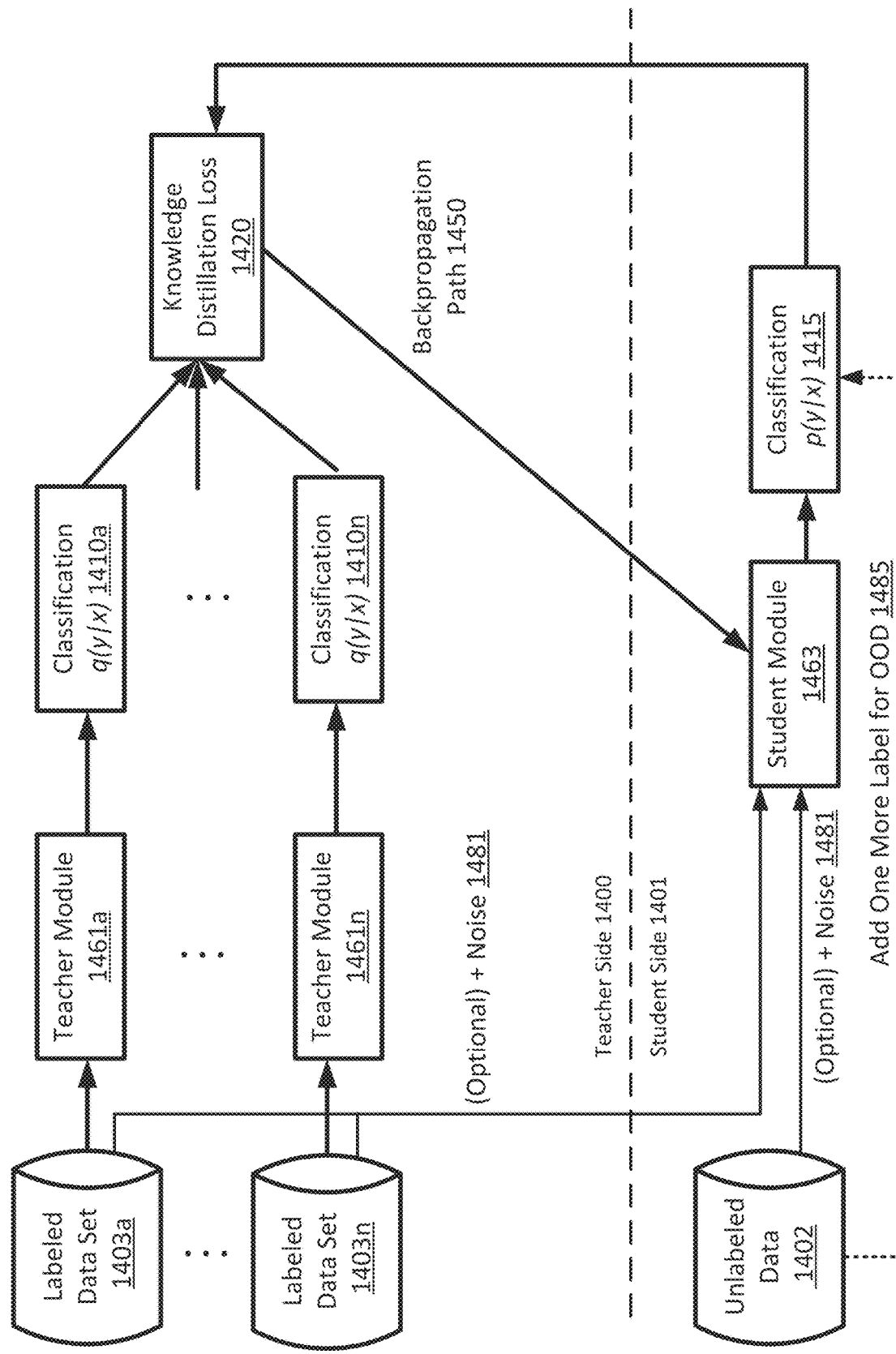
FIG. 14 is a simplified diagram of an architecture of knowledge distillation learning for OOD training, according to some embodiments.

FIG. 14 is a simplified diagram of an architecture of knowledge distillation learning for OOD training, according to some embodiments. The architecture may include the teacher side 1400 and the student side. The teacher side 1400 may be used to train one or more teacher modules 1461a-n, each of which may comprise a BERT or ELMo model. Specifically, each teacher module 1461a-n is trained with their respective labeled data set 1403a-n, which may be obtained from training data 205 in FIG. 2.

To utilize the teacher modules 1461a-n to train the student module 1463, a batch of training samples are sent from the labeled data set 1403a-n to the teacher modules 1461a-n, each of which generates a respective output, e.g., the output of the last hidden layer of each teacher module. The output is then sent to a respective classification module 1410a-n to generate the respective classification probability q(Y|X), e.g., via a softmax probability operation. The generated classification probabilities are then fed to the knowledge distillation loss module 1420.

At the student side 1401, the same training data from data sets 1403a-n are fed to the student module 1463. In addition, unlabeled data 1402, which may be OOD samples generated by method 1200 shown in FIG. 12 from the labeled datasets 1403a-n, are also fed to the student module 1463 to train OOD detection. Thus, the student module 1463 may be pre-defined with one additional class for OOD samples than the set of pre-defined classes that the teacher modules 1461a-n are defined with.

The student module 1463 then generates an output to the classification module 1415, which generates the probability p(Y|X), representing probabilities that the input sample belongs to a particular in-domain class or an OOD class. The classification module 1415 may obtain the added label for OOD at 1485.

To learn the aggregated knowledge, the student module 1463 may be trained to minimize the difference between its own classification output and the aggregated classification output from the teacher modules 1461a-n, e.g., the knowledge distillation loss. At the knowledge distillation loss module 1420, the knowledge distillation loss may be computed, e.g., via an cross entropy loss, the difference between the in-distribution classification outputs from the teacher modules 1461a-1461n and the in-distribution classification outputs from the student module 1463. In the meantime, the loss of the OOD classification outputs from classification module 1415 may also be computed and incorporated into the knowledge distillation loss at 1420.

The knowledge distillation loss from module 1420 is then used to update the student module 1463 via the backpropagation path 1450. In this case, the student 1463 would learn the knowledge from its teachers 1461*a-n*.

In some examples, various OOD identification and training techniques discussed in relation to FIGS. 4-13 may be used at the student module 1463. For example, inputs to the student module 1463 may be preprocessed with a Gaussian noise at 1481 to yield a Lipchitz property of the module. For another example, the student module 1463 may be trained with input data from 1403*a-n* having a high feature dimension, but then the outputs may be pruned to a smaller feature dimension using the sparsification technique discussed in relation to method 800 in FIG. 8.

Figure 15:
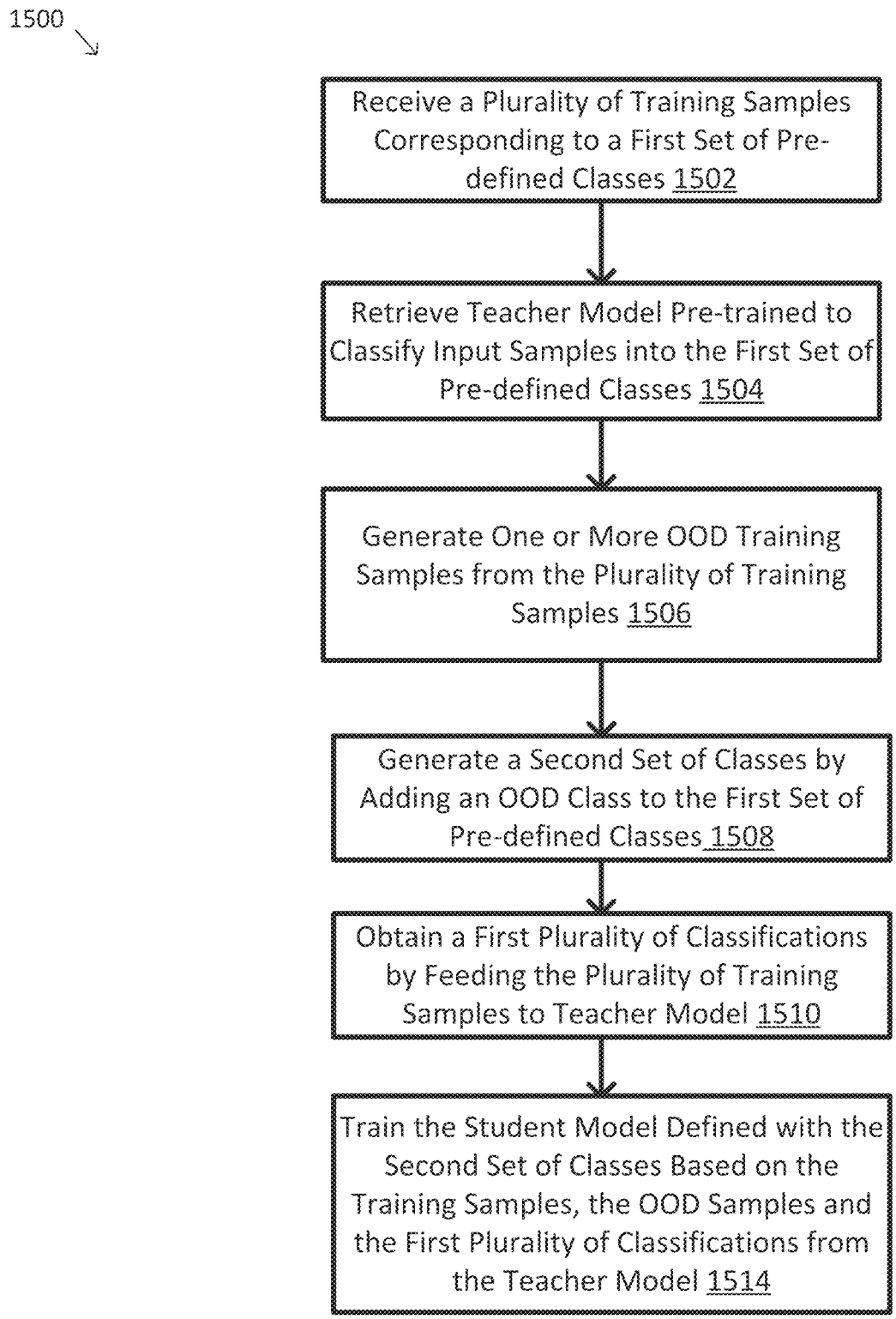
FIGS. 15-16 are simplified logic flow diagrams illustrating methods for training a student module via knowledge distillation learning from a teacher module using the architecture shown in FIG. 14, according to some embodiments.
Figure 16:
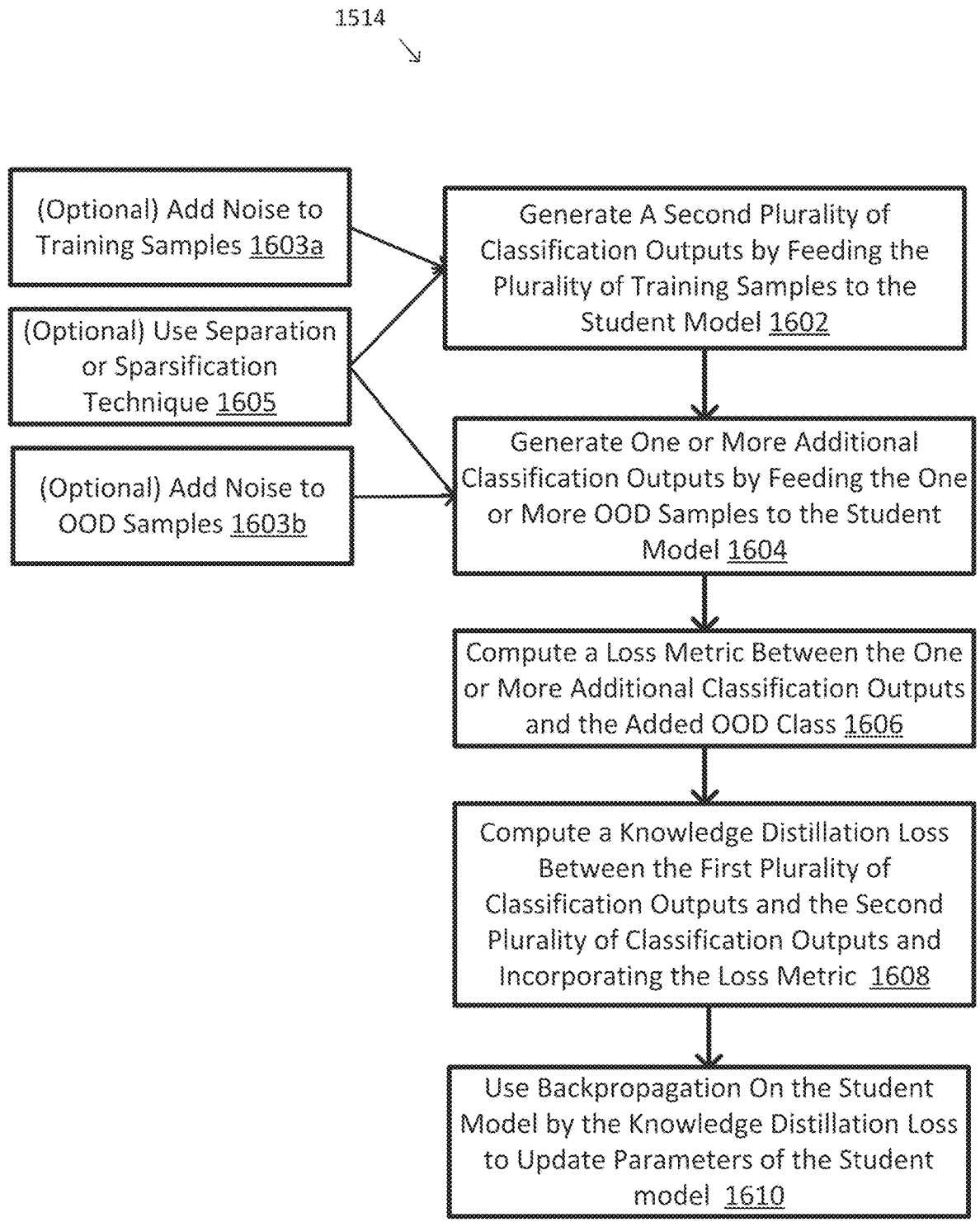

FIGS. 15-16 are simplified logic flow diagrams illustrating methods for training a student module via knowledge distillation learning from a teacher module using the architecture shown in FIG. 14, according to some embodiments. One or more of the processes 1502-1514 of method 1500 and 1602-1610 of method 1514 may be implemented, at least in part, in the form of executable code stored on non-transitory, tangible, machine-readable media that when run by one or more processors (e.g., processor 310) may cause the one or more processors to perform one or more of the processes 1502-1514 of method 1500 and 1602-1610 of method 1514. In some embodiments, method 1500 may correspond to the methods used by the OOD training module 360.

At step 1502, a plurality of input training samples corresponding to a first set of pre-defined classes may be received, e.g., input samples 340 may be received via communication interface 305 shown in FIG. 3A. In some embodiments, the input sample may be a natural language sentence such as 111 in FIG. 1.

At step 1504, a teacher module (e.g., 1461*a-n*) that is pre-trained to classify input samples into the first number of classes is obtained.

At step 1506, one or more OOD training samples are generated from the plurality of training samples. For example, method 1200 of FIG. 12 may be used to generate the OOD training samples.

At step 1508, a second number of classes is generated by adding an OOD class to the first number of classes.

At step 1510, a plurality of outputs are obtained by feeding the plurality of training samples to the teacher modules, e.g., 1461*a-n*.

At step 1514, the student module (e.g., 1463) defined with the second number of classes may be trained using the plurality of training samples and the one or more out-of-distribution training samples and the obtained plurality of outputs from the teacher module (e.g., 1461*a-n*).

For example, to perform step 1514, as further shown in FIG. 16, at step 1602, a second plurality of classification outputs may be generated by feeding the plurality of training samples to the student module (e.g., 1463). At step 1604, one or more additional classification outputs are generated by feeding the one or more OOD samples (e.g., data 1402) to the student module. At step 1606, a loss metric is computed between the one or more additional classification outputs and the added OOD class. At step 1608, the knowledge distillation loss is computed between the first plurality of classification outputs (from teacher modules 1461*a-n*) and the second plurality of classification outputs (from student module 1463), which also incorporates the loss metric from ODD detection. At step 1610, backpropagation may be used on the student module based on the knowledge distillation loss to update parameters of the student module.

In addition, at steps 1603*a-b*, Gaussian noise may be optionally added to the training samples and/or the ODD samples to preprocess the input samples to the student module. At step 1605, the separation or sparsification technique may be optionally applied to the student module.

In this way, the student module is trained to approximate the behavior of the teacher modules, e.g., BERT or ELMo, and is trained with OOD detection.

Some examples of computing devices, such as computing device 100 may include non-transitory, tangible, machine readable media that include executable code that when run by one or more processors (e.g., processor 220) may cause the one or more processors to perform the processes of methods 400, 600*a-b* and/or Algorithm 500 of FIG. 5. Some common forms of machine readable media that may include the processes of method 400, 600*a-b* and/or Algorithm 500 of FIG. 5 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for distilling knowledge from a first neural network to train a second neural network, the method comprising:
receiving a plurality of training samples corresponding to a first set of pre-defined classes from a given dataset;

retrieving the first neural network that is pre-trained to classify input samples into the first set of pre-defined classes;
obtaining a first plurality of classifications by feeding the plurality of training samples to the first neural network;
transforming, using an out-of-distribution (OOD) sample generation module, one or more of the plurality of the training samples into one or more out-of-distribution (OOD) training samples, wherein the transforming further includes:
  computing, using a term frequency-inverse document frequency model, inter-class word importance probabilities of one or more words of a training sample in the plurality of training samples, wherein the inter-class word importance probabilities indicate that the one or more words distinguish between the first plurality of classifications;
  computing, using a discriminator model, in-distribution word importance probabilities of the one or more words of a training sample in the plurality of training samples, wherein the in-distribution word importance probabilities indicate contributions of the one or more words to a classification in the first plurality of classifications;
  identifying a set of the one or more words within the training sample based on the inter-class word importance probabilities and the in-distribution word importance probabilities; and
  replacing the set of the one or more words within the training sample with one or more random words;
generating a second set of classes by adding an out-of-distribution class to the first set of pre-defined classes; and
training the second neural network defined with the second set of classes based on the plurality of training samples, the one or more out-of-distribution training samples and the first plurality of classifications from the first neural network.

2. The method of claim 1, wherein the first neural network includes any combination of a bidirectional encoder representation from transformers (BERT) model and embeddings from language models (ELMO).

3. The method of claim 1, wherein the second neural network has a smaller size than the first neural network, and the second neural network is implementable on a central processing unit.

4. The method of claim 1, further comprising:
training, using a customer dataset, the first neural network to classify input samples into the first set of pre-defined classes, wherein the customer dataset includes the plurality of training samples.

5. The method of claim 1, wherein the training the second neural network defined with the second set of classes comprises:
generating a second plurality of classification outputs by feeding the plurality of training samples to the second neural network;
computing a knowledge distillation loss between the first plurality of classifications and the second plurality of classification outputs; and
using backpropagation on the second neural network by the knowledge distillation loss to update parameters for the second neural network.

6. The method of claim 5, further comprising:
generating one or more additional classification outputs by feeding the one or more out-of-distribution training samples to the second neural network;
computing a loss metric between the one or more additional classification outputs and a classification distribution corresponding to the added out-of-distribution class; and
incorporating the loss metric into the knowledge distillation loss.

7. The method of claim 1, wherein the training the second neural network defined with the second set of classes further comprises:
preprocessing the plurality of training samples or the one or more out-of-distribution training samples by adding a Gaussian noise component before feeding the plurality of training samples or the one or more out-of-distribution training samples to the second neural network.

8. The method of claim 1, wherein the training the second neural network defined with the second set of classes further comprises:
generating a number of reference class vectors corresponding to the first set of pre-defined classes; and
determining whether an input sample belongs to the added out-of-distribution class based on whether a vector representation of the input sample is orthogonal to the number of reference class vectors.

9. The method of claim 1, wherein the training the second neural network defined with the second set of classes further comprises:
training the second neural network using the plurality of training samples having a first feature dimension;
in response to receiving an input sample having the first feature dimension, using a Gaussian distribution based sparsification vector to reduce the first feature dimension to a second feature dimension; and
generating, via the second neural network, an output based on the input sample having the second feature dimension.

10. A system for distilling knowledge from a first neural network to train a second neural network, the system comprising:
a communication interface that receives a plurality of training samples;
a memory containing machine readable medium storing machine executable code; and
one or more processors coupled to the memory and configurable to execute the machine executable code to cause the one or more processors to:
receive a plurality of training samples corresponding to a first set of pre-defined classes from a given dataset;
retrieve the first neural network that is pre-trained to classify input samples into the first set of pre-defined classes;
obtain a first plurality of classifications by feeding the plurality of training samples to the first neural network;
transform, using an out-of-distribution (OOD) sample generation module, one or more of the plurality of the training samples into one or more out-of-distribution training samples, wherein the transformation further includes:
  computing, using a term frequency-inverse document frequency model, inter-class word importance probabilities of one or more words of a training sample in the plurality of training samples, wherein the inter-class word importance probabilities indicate that one or more words distinguish between the first plurality of classifications;
  computing, using a discriminator model, in-distribution word importance probabilities of the one or more words of a training sample in the plurality of training samples, wherein the in-distribution word importance probabilities indicate contributions of the one or more words to a classification in the first plurality of classifications;

identifying a set of the one or more words within the training sample based on the inter-class word importance probabilities and the in-distribution word importance probabilities; and replacing the set of the one or more words within the training sample with one or more random words;

generate a second set of classes by adding an out-of-distribution class to the first set of pre-defined classes; and train the second neural network defined with the second set of classes based on the plurality of training samples, the one or more out-of-distribution training samples and the first plurality of classifications from the first neural network.

11. The system of claim 10, wherein the first neural network includes any combination of a bidirectional encoder representation from transformers (BERT) model and embeddings from language models (ELMO).

12. The system of claim 10, wherein the second neural network has a smaller size than the first neural network, and the second neural network is implementable on a central processing unit.

13. The system of claim 10, wherein the one or more processors are configurable to execute the machine executable code to cause the one or more processors to:

train, using a customer dataset, the first neural network to classify input samples into the first set of pre-defined classes, wherein the customer dataset includes the plurality of training samples.

14. The system of claim 10, wherein the one or more processors are configurable to execute the machine executable code to cause the one or more processors to train the second neural network defined with the second set of classes by:

generating a second plurality of classification outputs by feeding the plurality of training samples to the second neural network;

computing a knowledge distillation loss between the first plurality of classifications and the second plurality of classification outputs; and using backpropagation on the second neural network by the knowledge distillation loss to update parameters for the second neural network.

15. The system of claim 14, wherein the one or more processors are configurable to execute the machine executable code to cause the one or more processors to:

generate one or more additional classification outputs by feeding the one or more out-of-distribution training samples to the second neural network;

compute a loss metric between the one or more additional classification outputs and a classification distribution corresponding to the added out-of-distribution class; and incorporate the loss metric into the knowledge distillation loss.

16. The system of claim 10, wherein the one or more processors are configurable to execute the machine executable code to cause the one or more processors to train the second neural network defined with the second set of classes by:

preprocessing the plurality of training samples or the one or more out-of-distribution training samples by adding a Gaussian noise component before feeding the plurality of training samples or the one or more out-of-distribution training samples to the second neural network.

17. The system of claim 10, wherein the one or more processors are configurable to execute the machine executable code to cause the one or more processors to train the second neural network defined with the second set of classes by:

generating a number of reference class vectors corresponding to the first set of pre-defined classes; and determining whether an input sample belongs to the added out-of-distribution class based on whether a vector representation of the input sample is orthogonal to the number of reference class vectors.

18. The system of claim 10, wherein the one or more processors are configurable to execute the machine executable code to cause the one or more processors to train the second neural network defined with the second set of classes by:

training the second neural network using the plurality of training samples having a first feature dimension;

in response to receiving an input sample having the first feature dimension, using a Gaussian distribution based sparsification vector to reduce the first feature dimension to a second feature dimension; and generating, via the second neural network, an output based on the input sample having the second feature dimension.

19. A non-transitory computer readable medium storing instructions thereon, that when executed by a computing device cause the computing device to perform operations comprising:

receiving a plurality of training samples corresponding to a first set of pre-defined classes from a dataset;

retrieving a first neural network that is pre-trained to classify input samples into the first set of pre-defined classes;

obtaining a first plurality of classifications by feeding the plurality of training samples to the first neural network;

transforming, using an out-of-distribution (OOD) sample generation module, one or more of the plurality of the training samples into one or more out-of-distribution (OOD) training samples, wherein the transforming further includes:

computing, using a term frequency-inverse document frequency model, inter-class word importance probabilities of one or more words of a training sample in the plurality of training samples, wherein the inter-class word importance probabilities indicate that the one or more words distinguish between the first plurality of classifications;

computing, using a discriminator model, in-distribution word importance probabilities of the one or more words of a training sample in the plurality of training samples, wherein the in-distribution word importance probabilities indicate contributions of the one or more words to a classification in the first plurality of classifications;

identifying a set of the one or more words within the training sample based on the inter-class word importance probabilities and the in-distribution word importance probabilities; and replacing the set of the one or more words within the training sample with one or more random words;

generating a second set of classes by adding an out-of-distribution class to the first set of pre-defined classes; and training a second neural network defined with the second set of classes based on the plurality of training samples, the one or more out-of-distribution training samples and the first plurality of classifications from the first neural network.

20. The non-transitory computer readable medium of claim 19, wherein the first neural network includes any combination of a bidirectional encoder representation from transformers (BERT) model and embeddings from language models (ELMO).

* * * * *